United States Patent [19]

Silverman et al.

[11] Patent Number: 5,136,501
[45] Date of Patent: Aug. 4, 1992

[54] ANONYMOUS MATCHING SYSTEM

[75] Inventors: David L. Silverman, Nesconset; Norman Keller, Mt. Sinai, both of N.Y.

[73] Assignee: Reuters Limited, London, England

[21] Appl. No.: 357,478

[22] Filed: May 26, 1989

[51] Int. Cl.[5] .................... G06F 15/20; G06G 7/52
[52] U.S. Cl. .................................................... 364/408
[58] Field of Search ............................... 364/401, 408

[56] References Cited

U.S. PATENT DOCUMENTS

| | | | |
|---|---|---|---|
| 3,573,747 | 4/1971 | Adams et al. | 364/408 |
| 3,697,693 | 10/1972 | Deschenes et al. | 364/408 |
| 4,677,552 | 6/1987 | Sibley, Jr. | 364/408 |
| 4,766,293 | 8/1988 | Boston | 364/408 |
| 4,774,663 | 9/1988 | Musamanno et al. | 364/408 |
| 4,903,201 | 2/1990 | Wagner | 364/900 |

OTHER PUBLICATIONS

Welles, *Institutional Investor* "The Computer Assault on New York's Foreign Exchange Market"; May 1976, 32.

Primary Examiner—Dale M. Shaw
Assistant Examiner—Laura Brutman
Attorney, Agent, or Firm—Bryan Cave

[57] ABSTRACT

A matching system for trading instruments in which bids are automatically matched against offers for given trading instruments for automatically providing matching transactions in order to complete trades for the given trading instruments, includes a host computer means (20) comprising means for anonymously matching active bids and offers in the system by trading instrument based on a variable matching criteria, which comprises counterparty credit limit between counterparties (24a, 26b) to a potential matching transaction. The system also includes a transaction originating keystation (24a) for providing a bid on a given trading instrument to the system for providing the potential matching transaction; a counterparty keystation (26b) for providing an offer on the given trading instrument involved in the potential matching transaction; and network means (22) for interconnecting the host computer means (20), the transaction originating keystation (24a) and the counterparty keystation (26b) in the system for enabling data communications therebetween. Both the transaction originating keystation (24a) and the counterparty keystation (26b) for the potential matching transaction each have an associated counterparty credit limit, with the system (20) blocking completion of the potential matching transaction between the transaction originating keystation (24a) and the counterparty keystation (26b) when the potential matching transaction has an associated value in excess of counterparty credit limit. The assigned credit limits may be reset or varied by the users (24a, 26b) to change the ability of the user or subscriber to effectuate deals.

57 Claims, 14 Drawing Sheets

DATAFLOW 2: HIT BID/TRADE

CENTRAL STATION BOOK

KEYSTATION BOOK

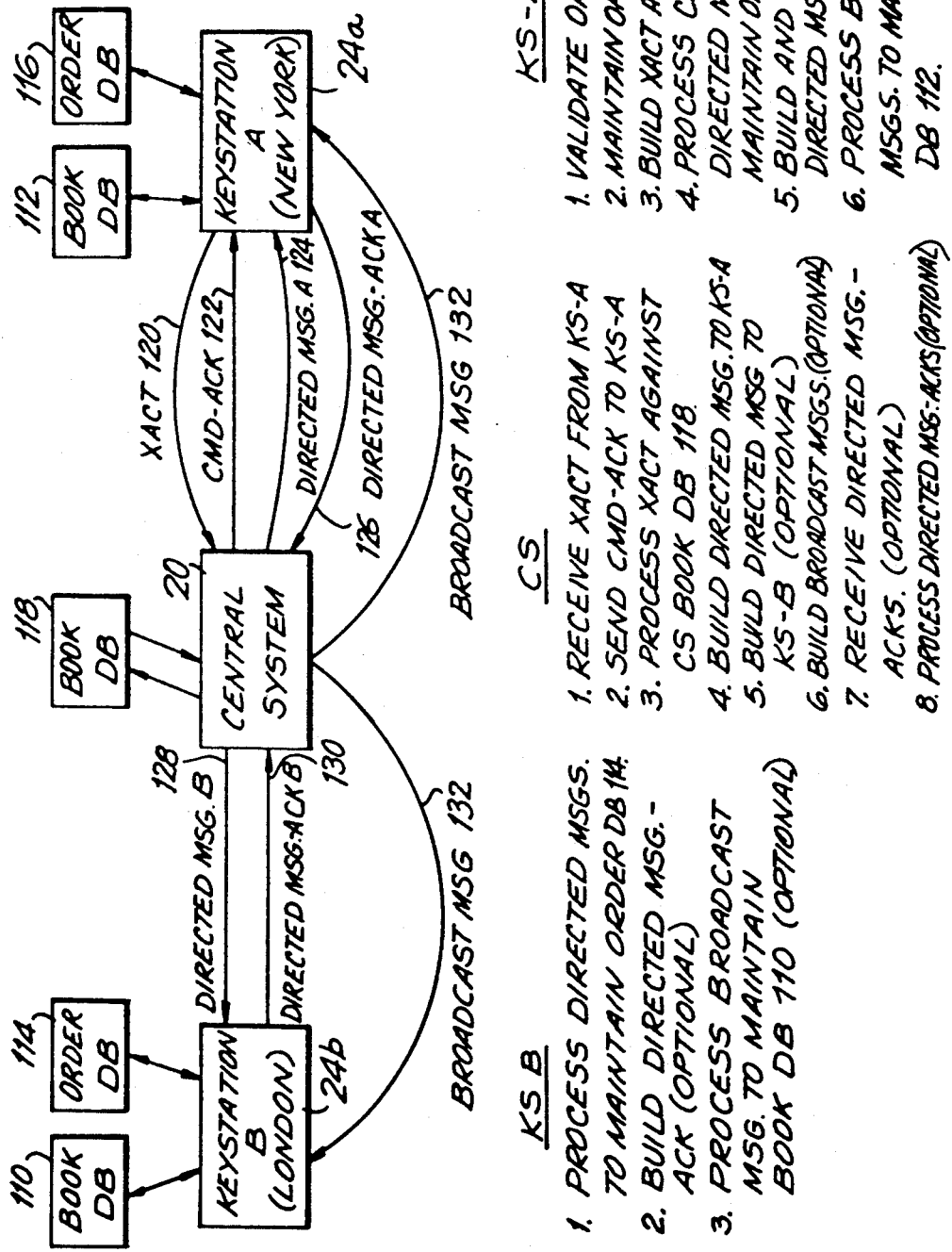

FIG. 7

| FIELD | BYTE | FIELD NAME | SIZE | TYPE |
|---|---|---|---|---|
| 1 | 0 | PROTOCOL TYPE | 01 | BYTE |
| 2 | 1 | SERVICE ID | 01 | BYTE |
| 3 | 2 | TIME STAMP | 04 | TIME TYPE |
| 4 | 6 | MESSAGE CLASS | 01 | ENUM |
| 5 | 7 | KEYSTATION ADDRESS | 04 | ADDRESS TYPE |
| 6 | 11 | MSG. SEQUENCE NUMBER | 02 | WORD |

FIG. 8

| 7 | 13 | MESSAGE TYPE | 01 | ENUM |
|---|---|---|---|---|
| 8 | 14 | MESSAGE GROUP | 01 | ENUM |
| 9 | 15 | HOST XACT NUMBER | 04 | LONGWORD |
| 10 | 19 | IxM TOKEN | 04 | LONGWORD |
| 11 | 23 | UPDATE IDENTIFIER | 01 | ENUM |
| 12 | 24 | IxM SEQUENCE NUMBER | 01 | BYTE |
| 13 | 25 | RFR STATE | 01 | ENUM |
| 14 | 26 | TRADE WORKUP QUANTITY | 04 | QUANTITY TYPE |
| 15 | 30 | BLOCK LIST SIZE | 01 | BYTE |
| 16 | 31 | NUMBER OF HIGHS | 01 | BYTE |
| 17 | 32 | NUMBER OF LOWS | 01 | BYTE |
| 18 | 33 | NUMBER OF TRADES | 01 | BYTE |
| 19 | 34 | NUMBER OF OPERATIONS | 01 | BYTE |

FIG. 9

HIGH BLOCK

| FIELD | BYTE | FIELD NAME | SIZE | TYPE |
|---|---|---|---|---|
| 1 | 0 | HIGH QUOTE | 08 | QUOTE TYPE |

FIG. 10

LOW BLOCK

| FIELD | BYTE | FIELD NAME | SIZE | TYPE |
|---|---|---|---|---|
| 1 | 0 | LOW QUOTE | 08 | QUOTE TYPE |

FIG. 11

TRADE BLOCK

| FIELD | BYTE | FIELD NAME | SIZE | TYPE |
|---|---|---|---|---|
| 1 | 0 | TRADE QUOTE | 08 | QUOTE TYPE |
| 2 | 8 | TRADE QUANTITY | 04 | QUANTITY TYPE |

FIG. 12

OPERATION BLOCK

| FIELD | BYTE | FIELD NAME | SIZE | TYPE |
|---|---|---|---|---|
| 1 | 0 | OPERATION CODE | 01 | ENUM |
| 2 | 1 | INDEX | 01 | BYTE |
| 3 | 2 | ENTRY TYPE | 01 | ENUM |
| 4 | 3 | ENTRY QUOTE | 08 | QUOTE TYPE |
| 5 | 11 | QUANTITY | 04 | QUANTITY TYPE |
| 6 | 15 | QUANTITY ATTRIBUTE | 01 | ENUM |

FIG. 19

| TYPE | PRICE | B/S | DURATION | SIZE |
|---|---|---|---|---|
| HIT (YOURS) | SPECIFIED OR BETTER | SELL | FOK | PRIMARY ONLY |
| TAKE (MINE) | SPECIFIED OR BETTER | BUY | FOK | PRIMARY ONLY |
| BID | SPECIFIED OR BETTER | BUY | GTC | PRIMARY + MORE |
| OFFER | SPECIFIED OR BETTER | SELL | GTC | PRIMARY + MORE |

FIG. 20

| SUBSCRIBER NAME | CREDIT LIMIT | CREDIT REMAINING |
|---|---|---|
| BANK ORDISH | 50.0 | 22.5 |
| BANK QUARLES | 125.0 | 0.5 |
| ETC. | | |

ANONYMOUS MATCHING SYSTEM

CROSS-REFERENCE TO RELATED APPLICATIONS

This application is related to the commonly owned co-pending U.S. Patent Applications entitled "Distributed Matching System", filed May 25, 1989, and naming, David L. Silverman, Alfred M. Scholldorf and Norman Keller as joint inventors thereof; and "Distributed Matching System Method", also filed May 25, 1989 and naming David L. Silverman, Alfred M. Scholldorf and Norman Keller as joint-inventors thereof; the contents of each of which is specifically incorporated by reference herein in their entirety.

TECHNICAL FIELD

The present invention relates to matching systems for effectuating trades of trading instruments through automatic matching in which buyers and sellers who are willing to trade with one another based on specified criteria, such as price, quantity and credit, may automatically trade when matching events occur satisfying these criteria, and more particularly to such matching systems in which real time prices are subject to real time credit in determining the quantity of permissible match.

BACKGROUND ART

Information retrieval systems for financial information, such as stock market type of information and money market information, normally employ a transfer of data in a high-performance, real-time information retrieval network in which update rates, retrieval rates and subscriber and/or user population are generally very high. An example of such a system is REUTERS DEALING SERVICE which is used in the foreign exchange or money market. Such systems, while providing rapid video conversation capability, are not anonymous systems nor do they provide for automated anonymous trading such as is possible in a matching system. Of course, conversational dealing systems have their place in the market and serve particular needs where appropriate. However, anonymous matching systems are also often desired and, by their very nature, do not normally employ a conversation capability since the parties to the transactions are unknown until the transaction has been completed. Examples of satisfactory prior art video conversational systems for use in connection with trading of financial information are disclosed in commonly owned U.S. Pat. Nos. 4,531,184; 4,525,779 and 4,404,551, by way of example. Prior art examples of matching systems used in connection with the trading of trading instruments are disclosed in U.S. Pat. No. 4,412,287, which discloses as an automated stock exchange in which a computer matches buy and sell orders for a variety of stocks; U.S. Pat. No. 3,573,747, which discloses an anonymous trading system for selling fungible properties between subscribers to the system; U.S. Pat. No. 3,581,072, which discloses the use of a special purpose digital computer for matching orders and establishing market prices in an auction market for fungible goods; and U.S. Pat. No. 4,674,044, which discloses an automated securities trading system. However, none of these prior art matching systems implements or suggests the use of credit controls to determine the quantity of permissible match at the lowest common credit limit and the best bid/ask price for the largest available quantity to automatically complete a match at trade in which real time prices are subject to real time credit, such as a gross counterparty credit limit between potential parties to a matching transaction. Moreover no prior art matching systems are known to applicants in which an anonymous "more quantity" bid may be employed for additional orders at the same price. In addition, no prior art matching systems are known to applicants in which directed messages are employed between the keystations in the system and the central system to update the local entry order data bases and broadcast messages are employed to update the keystation book which is a restricted subset of the host or central system book. Furthermore, none of these prior art system employ summary books at the local keystations as subsets of the host or central system book.

In the system of the present invention, as opposed to the prior art known to applicants, the central system maintains a data base consisting of all of the trading instruments available for trade, credit information with respect to potential counterparties which may be dynamically varied by the keystations, and the bids and offers that are present throughout the system, while the client sites or keystations, which are subject to gross counterparty credit limits in determining permissible matches, maintain copies of only the best bids and offers and use those to generate a display. Thus, the client sites have some restricted subset of the total depth of the system book located at the central data base. By transmitting only subsets of the total system book from the host, the amount of network overhead that is required is significantly reduced, which reduction is further enhanced by the use of only summary information in the keystation books. Moreover, this enables the central data base maintaining a full set of information for every entry including identification of the parties which identification is not to be provided for the subset books at the keystations in an anonymous trading system, and the assigned counterparty credit limit for all potential counterparties in the system, with these counterparty credit limits not being provided to the keystations and, thus, the gross counterparty credit limits are kept anonymous in the system. The only time that the keystation is made aware of the parties involved in the transaction is after the transaction has been completed, but they are preferably never made aware of the counterparty credit limits assigned to them. In this regard, if the anonymous gross counterparty credit limit is exceeded by the potential transaction the transaction will not be completed. Thus, in the system of the present invention, the host may anonymously inhibit the occurrence of trades even though the price and quantity would otherwise match. The various credit limits are individually set by the keystations, with the anonymous gross counterparty credit limit being the minimum of the two credit limits between counterparties to a potential matching transaction. The individual keystations may reset all credit limits or dynamically vary individual credit limits with such variations sometimes enabling previously inhibited trades to then go foward because the new resulting anonymous gross counterparty credit limit then may no longer be exceeded.

Apart from the above gross counterparty credit control of the trading environment, the host may also dynamically vary the display depth of the book distributed to the local keystation, so that at given times or given days different aspects of the trading environment can be displayed. In this regard, although dynamic control of the content of a local receiver data base from a transmitted data base in an information retrieval communication network has been previously employed by applicants' assignee, such as disclosed in U.S. Pat. Nos. 4,745,559 and 4,750,135, these systems are, nevertheless, different from the type of system control employed in the system of the present invention in which real time prices are subject to real time credit control or in which restricted subsets of the host book are maintained as summary books at the keystation local data bases. Thus, the system of the present invention for providing a distributed matching system varying real time credit control over the matching process overcomes the disadvantages of the prior art.

DISCLOSURE OF THE INVENTION

A matching system for trading instruments is provided in which bids are automatically matched against offers for given trading instruments for automatically providing matching transactions in order to complete trades for the given trading instruments such as foreign exchange currencies, in which real time prices are subject to real time credit controls to anonymously block or inhibit the completion of potential matching transactions which do not satisfy an anonymous gross counterparty credit limit. Each of the keystations or client sites in the system assigns trading party credit limits to the other client sites in the system with which it is desired to trade, with these trading party credit limits being maintained anonymously by the host computer and being used by the host computer to anonymously determine gross counterparty credit limits for each potential matching transaction. The gross counterparty credit limit for a given potential matching transaction is the minimum of the trading party credit limits for each of the counterparties involved in the potential matching transaction.

The host computer anonymously matches active bids and offers in the system based on a variable matching criteria which includes the gross counterparty credit limit between counterparties to a potential matching transaction, price, and available quantity. The system comprises the host computer, a transaction originating keystation for providing a bid on a given trading instrument to the system for providing the potential matching transaction, a counterparty keystation for providing an offer on the given trading instrument involved in the potential matching transaction, and a network for interconnecting the host computer, the transaction originating keystation, and the counterparty keystation for enabling data communications therebetween. Both the transaction originating keystation and the counterparty keystation for the potential matching transaction each have an associated counterparty credit limit, with the system blocking or inhibiting completion of the potential matching transaction between the transaction originating keystation and the counterparty keystation when the potential matching transaction has an associated value in excess of the counterparty credit limit. The individual keystations or client sites may individually vary the assigned trading party credit limits which will, in turn, cause the host computer to change the anonymous gross counterparty credit limits in response thereto, or may reset all trading credit party limits which will, in turn, again cause the host computer to change or vary the anonymous gross counterparty credit limits in response thereto. In this regard, the host computer may provide a credit limit alert to the assigning keystation when the assigned trading party credit limit for another keystation goes below a predetermined value, such as 25% of the original value of the assigned trading party credit limit.

The host computer in anonymously matching the active bids and offers in the system, determines the quantity of permissible match at the lowest common counterparty credit limit and the best bid ask price for the largest available quantity for automatically completing the potential matching transaction. Preferably, the host computer, which dynamically updates the prices based on the best available bids in the system, processes the matching transactions for a given trading instrument in time order entry to the matching system, with the matching criteria further comprising an order priority based on price, quantity type and time order entry. With respect to quantity type, it may be a primary quantity type or a more quantity type, with the primary quantity type being disclosed to the other keystations in the system while the more quantity type is maintained as a hidden value of the additional quantity beyond the disclosed primary quantity at which a given keystation is willing to trade for a given trading instrument. Preferably, the primary quantity type has a higher order priority than the more quantity type in the system.

Both the transaction originating keystation and the counterparty keystation, which, of course, can comprise more than one counterparty for a given transaction, for the potential matching transaction each have an associated local data base keystation book comprising a subset of the host book. The content of each of the keystation books has an associated display depth range which is controllable by the host computer and is updatable by transaction update broadcast messages received from the host computer through the network, although the keystation books do not contain counterparty credit limits or gross counterparty credit limits which are kept anonymous by the host. The network is preferably transparent to the transactions communicated via the network. The transaction originating keystations and the counterparty keystation or keystations comprise means responsive to the received transaction update broadcast messages for updating the associated keystation books and further comprise means for providing directed messages to the host computer corresponding to the bid and the offer, respectively. The directed messages, which may include the assigning, changing or resetting of trading party credit limits by the keystations, are processed and used to update the host book. The host computer comprises means for conditionally providing the transaction broadcast update messages to the keystations in the system in response to the presence of an update condition. The update condition comprises updating of the host book and the received bid or offer having a relative value compared with other bids or offers within the host book ,which is within the keystation book display depth range of relative values. The subset keystations books preferably comprise accumulated summaries of corresponding bids and offers in the host book, with the summaries comprising an accumulation of common price bids and an accumulation of common price offers. Preferably, the bids and offers comprise logical data. Tokens are used in the system for transmission of the data with respect to users and other information. The keystation book, as was previously mentioned, comprises displayable data having a defined keystation book display depth range, such as the best bid or offer, the next best bid or offer, and so forth, and bids and offers which fall outside that display depth range are not displayed. Thus, the keystation books each comprise a restricted subset of the total depth of the host book with respect to the best bids and offers present in the host book data base. These bids and offers contained in the keystation books are anonymous prior to the completion to the matching transaction. In this regard, preferably a display depth of one for the keystation books would prevent looking into the host book at the keystation. In the system of the present invention, the broadcast messages from the host or central system are broadcast to all of the keystations in the matching system and are used to update the keystation books whereas the directed messages which are sent from the central system or host are directed back only to the keystations involved in the actual matching transaction. These directed messages are used to update the local entry data base or order book at the local keystations involved in the transaction so as to indicate what has happened to the offer or bid at that particular keystation made in connection with the matching transaction. Thus, by employing the distributed matching system of the present invention, real time prices are subject to real time credit controls which may be dynamically varied, to control potential matches which would otherwise occur based on price and quantity, and controllable subsets of a distributable system trading book may be selectively provided to the various trading keystations in the matching system from the host or central system in order to controllably mask the available trading market and efficiently transmit only the required matching information to those keystations which require it.

BRIEF DESCRIPTION OF DRAWINGS

FIG. 6 is a functional block diagram illustrating the flow of information in the system of the present invention in connection with a typical matching transaction;

FIGS. 7–12 are illustrative diagrams of a typical IXM update broadcast message structure in accordance with the system of the present invention;

FIG. 19 is an illustrative diagram showing typical order types which may be implemented with the system of the present invention; and FIG. 20 is an illustrative diagram of a typical credit limit display of assigned trading party credit limits at given client site in accordance with the system of the present invention.

BEST MODE FOR CARRYING OUT THE INVENTION

Figure 1:
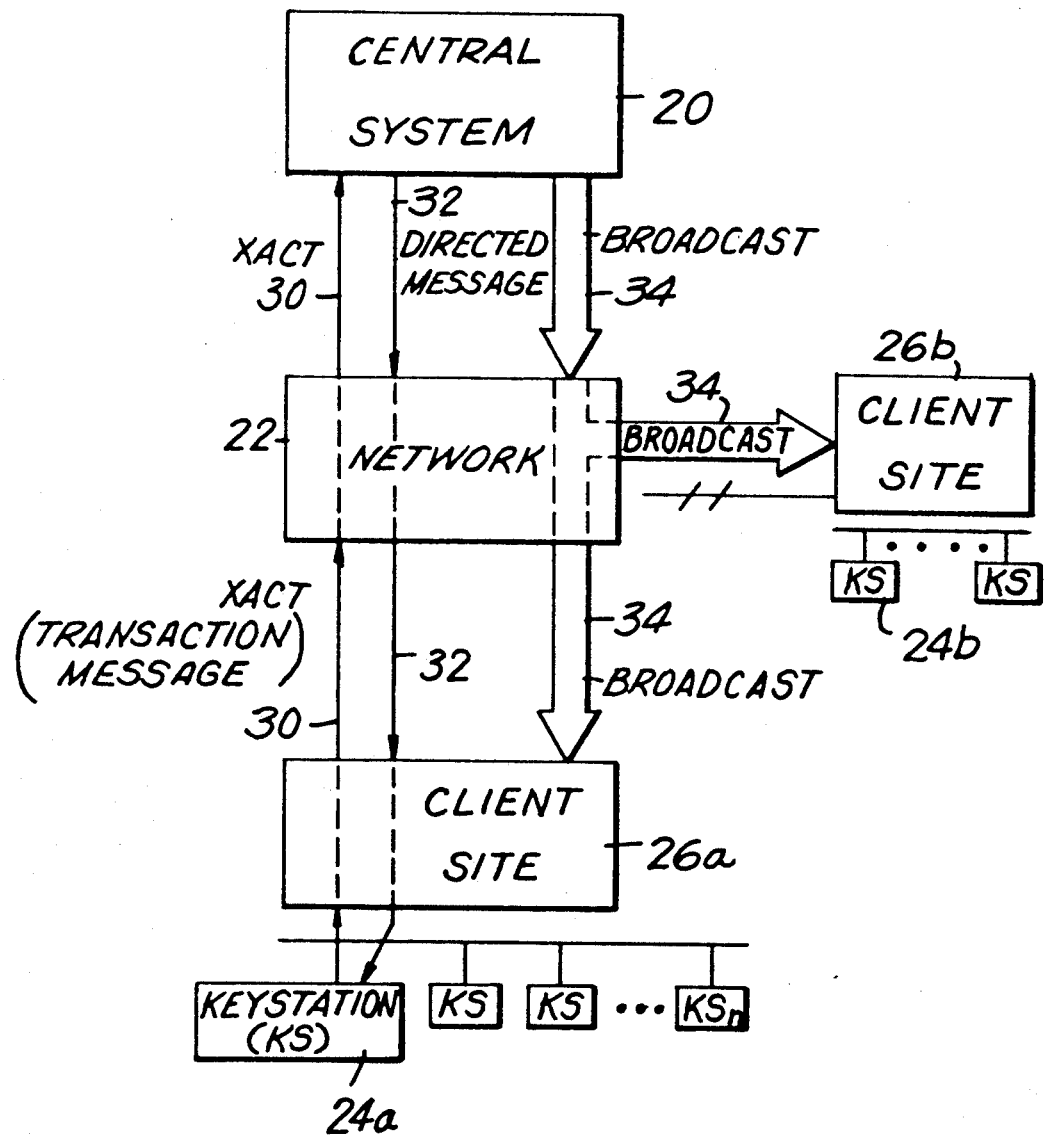
FIG. 1 is an overall system functional block diagram of the distributed matching system of the present invention.

Referring now to to drawings in detail and initially to FIG. 1 thereof, the system of the present invention is a distributed anonymous matching system for use in trading various trading instruments, such as different foreign exchange currencies. In the system of the present invention as described herein, the trading is effectuated through anonymous matching as opposed to through the conversation video system described in U.S. Pat. Nos. 4,531,184; 4,525,779; and 4,404,551, commonly owned by applicants' assignee herein. Thus, the distributed matching system of the present invention may be thought of as a computerized exchange in which its central role is to identify a buyer and a seller who are willing to trade with one another based on specified criteria, such as price, quantity and credit, with, as will be described in greater detail hereinafter, real time prices preferably being subject to real time credit. Thus, preferably, credit controls are used to determine the quantity of permissible match at the lowest common credit limit and the best bid/ask price for the largest available quantity to automatically complete a matched trade in the anonymous trading system of the present invention. When such a matching event occurs, preferably the buyer and seller are informed of the trade and sufficient information is then provided to them to complete the physical clearing of the transaction. In order to support this central function, the matching system requires various support functions one of which is preferably the maintenance of summary market information on the participant's workstation or keystation displays at the various client sites. Preferably in the system of the present invention, at all times the system will display the best inside price for every instrument traded on the system. The best inside price is preferably defined to be the highest value bid and the lowest value offer in the system. Preferably the prices are displayed together with the quantity bid or offered at the specified price so that the trader at the keystation can observe the market activity.

By observing the market activity, the trader can decide whether to enter a bid, or enter an offer into the market in an effort to complete a matching transaction. Preferably, the anonymous matching system of the present invention essentially maintains a book of bids and offers in the central system 20 or host computer. A user or keystation at a client site, such as client site 26a or 26b illustrated in FIG. 1, by way of example, interacts with the book by submitting bid, offer, hit, or take transactions. The order entry function is preferably conventionally achieved through data entry using a conventional keyboard, pointing device such as a mouse or any other conventional data entry tool. The central system 20 validates the transaction request, processes the bid, offer, hit or take according to the rules of the market, and attempts to find matches between this new entry and the other bids and offers posted in the system book, subject to gross counterparty credit limits, as will be described in greater detail hereinafter, between the potential counterparties to a potential matching transaction. If a match is found, and satisfies all criteria, including not exceeding the gross counterparty credit limit, then the trade is automatically executed, the participants to the trade are informed, all databases and trader screens are updated as to the quantities traded and the quantities remaining and, if desired, a clearing agency may be informed as to the details of the trade so that payments and exchanges may be completed. If, on the other hand, a match cannot be found, or the gross counterparty credit limit is exceeded by the potential match which would otherwise match based on price and quantity per se, then the system preferably either disposes of the entry for hit or take or keeps the entry for bid or offer for later processing. Preferably in all cases transactions are processed to completion according to certain rules to be described in greater detail hereinafter and the various client sites 26a, 26b preferably receive real-time updates of the new status of the trading instruments. Thus, as shown and preferred in FIG. 1, the client site systems 26a and 26b only two of which are shown by way of example in FIG. 1, submit transactions, such as represented by reference numeral 30, as well as assigned trading party credit limits, to the central system 20 via the communication network 22. As will be explained in greater detail hereinafter with reference to FIG. 6, the submission of a transaction 30 from a client site 26a or 26b to the central system 20 will preferably result in one or more messages, represented by reference numeral 32, going directly back as a directed message to the client site 26a in this example, which initiated the transaction message. Another effect of the transaction message 30 being sent to the central system 20 is that for certain sorts of transactions, a broadcast message 34 is generated by the central system 20 which is then delivered to all client sites 26a, 26b attached to the central system 20. Thus, the directed response or the directed message 32 only goes back to the particular client site 26a and, more particularly, the particular keystation, 24a by way of example, at that client site 26a which initiated the transaction message whereas the broadcast message 34 goes to all client sites 26a, 26b and all of the various keystations associated at those client sites 26a, 26b. With respect to the assigned trading party credit limits, it is these limits which are used by the central system 20 to determine the anonymous gross counterparty credit limits which are used to control the completion of matching transactions. By way of example, in FIG. 1 a typical client site 26a is shown as having keystations 24a, 24b, 24c through to 24n with the number of keystations merely being limited by the capacity of the system and the desired processing time. With respect to the distribution of the functionality in the system of the present invention, the communication network 22 preferably does not really play a part in that it is transparent to transactional information. By this what is meant is that when the transactional information leaves the client site 26a, for example, it could be, if desired, encrypted or garbled in a way that the only other entity which could understand it would be the central system 20 and that would be irrelevant to the function of the network 22 since the network does not look at the messages, does not process the messages, and merely transfers these messages to the appropriate parts of the system, such as to the central system 20. In this regard, the network 22 is functioning similar to a paired cable in that it is a conduit to pass the information back and forth. Of course, the network 22 has various other communication functions which, however, for purposes of understanding the present invention are unnecessary to go into. Suffice it to say that preferably, the communication network 22 uses a protocol which can be termed hierarchal fan-out in which one node transmit to multiple nodes which in turn transmits to multiple other nodes. Thus, network 22 helps implement broadcast capabilities integrated with a message switching network to achieve full tolerance and broadcast distribution. It should be noted, when a potential match occurs, and the gross counterparty credit limit is not exceeded for that potential match, the central system 20 will preferably send directed messages or responses to all of those parties in the system that were involved in the match, so that, in some instances, two, three or more client site 26 maybe involved in receiving the directed message. However, this still differs from the broadcast message which is sent to all client sites irrespective of their involvement in a particular match.

Figure 2:
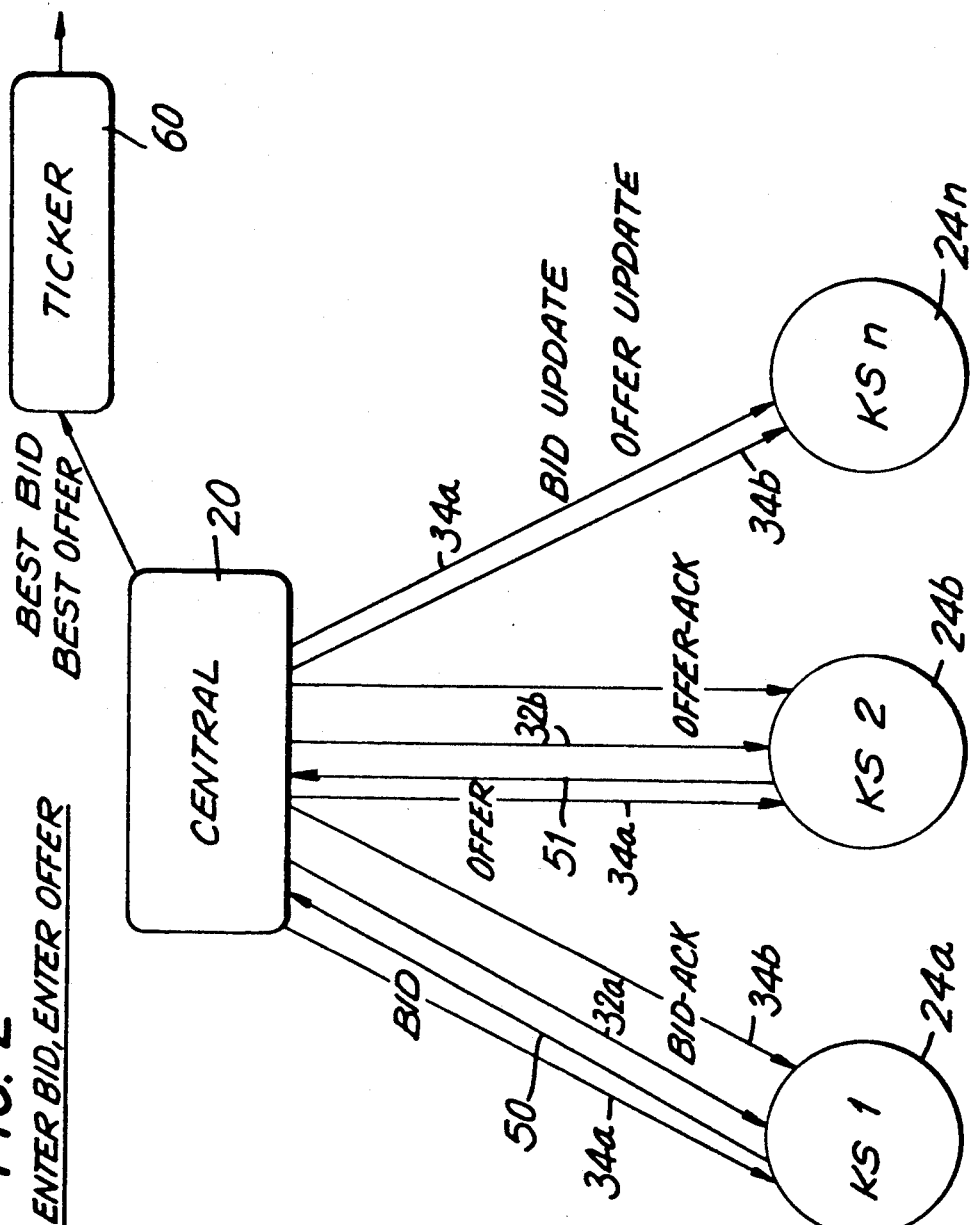
FIG. 2 is a functional block diagram of the system of FIG. 1 illustrating the flow of information in connection with the entry of a bid and the entry of an offer in the distributed matching system of FIG. 1.

Referring now to FIG. 2, this figure illustrates a typical data flow in accordance with the system of the present invention for entry of a bid or entry of an offer, with the network 22 being omitted since, as was previously mentioned, it is transparent to transactional information. First discussing the enter bid event in accordance with the system of the present invention, keystation 1 or 24a, submits a bid transaction to the central system 20. The directed message or directed response 32 which it receives back from the central system or host 20 is termed a bid acknowledgment or BID-ACK. This acknowledgment is a command acknowledgment which is preferably followed by an entry position message and is as was previously mentioned, is directed directly back to the keystation 24a. In addition, as shown and preferred in FIG. 2, a bid update message is broadcast by the central station 20 to all keystations in the system, such as represented by reference numeral 34a in FIG. 2. This broadcast message 34a preferably occurs if this new bid 32a was the new best bid in the system, or was an additional quantity being bid at the best price in the system. Thus, if this new bid 32a is at the highest price or better or higher, then it will result in a bid update broadcast message 34a going out throughout the system. In addition, as also shown by way of example in FIG. 2, if it is desired to disseminate an external ticker 60, then the ticker information 60 will also be provided of the best bid or best offer. Preferably, the same procedure is followed with respect to entry of an offer with the messages, in this instance, being identified as offer, given reference numeral 51, offer acknowledgment or OFFER-ACK, given reference numeral 32b, and the broadcast message for offer update, being given reference numeral 34b.

Figure 3:
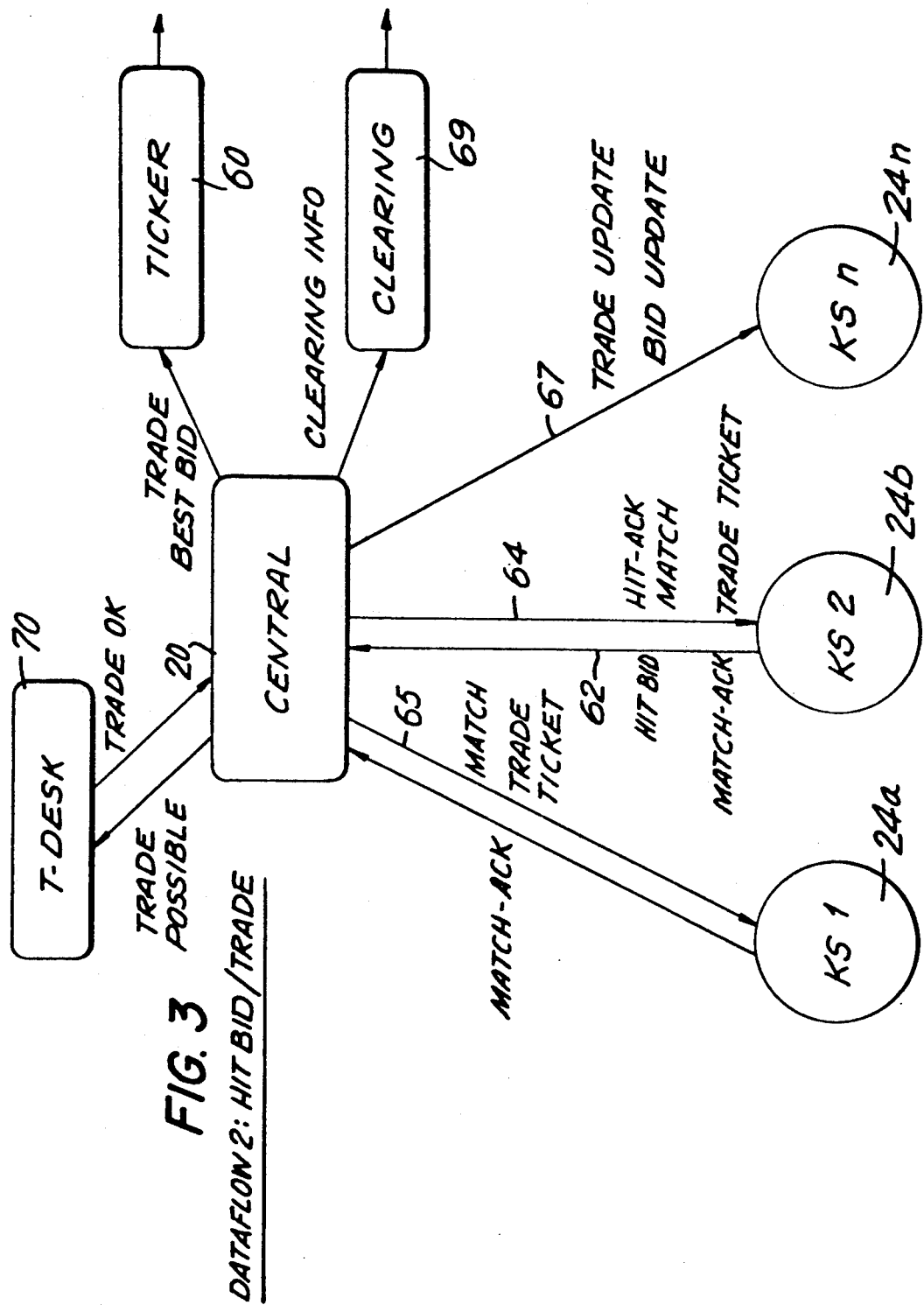
FIG. 3 is a functional block diagram similar to FIG. 2 of the flow of information in the distributed matching system of the present invention in connection with a hit bid or trade.

Referring now to FIG. 3, the data flow in accordance with the present invention is illustrated with respect to a situation in which there is a hit bid resulting in a trade. In this situation, there is substantially more activity than in the situation previously described with reference to FIG. 2. Thus, as shown and preferred in FIG. 3, if keystation 24b submits a transaction called "hit bid", represented by reference numeral 62, to the central station or host 20, a hit acknowledgment or HIT-ACK, represented by reference numeral 64, is provided back to keystation 24b as a directed message. At that point, the central system 20 will recognize that a match is possible because the "hit bid" message says that keystation 24b is willing to trade at the bid price. Assuming that the gross counterpart credit limit is not exceeded for this potential matching transaction, the central system 20 will determine that a match is possible. Preferably, however, before committing to the match, the central system 20 may get involved in a risk limiting protocol using a transaction desk 70 which determines whether the trade is possible, and if so, acknowledges this to the central system 20. Assuming that a trade is possible, and the gross counterparty credit limit has not been exceeded, then a match occurs. At that point several messages are generated from the central system 20. One of these messages is termed the match message, given reference numeral 65, which is a directed message that goes to the bidder, which in this instance is keystation 24b, and to the keystation 24a which originally owned the bid. Thus, in this instance, directed messages go to more than one keystation 24. Preferably, every match must be acknowledged so there is a match acknowledgment message, MATCH-ACK which comes back from the buyer and seller keystations 24b and 24a and is used to determine that the match was in fact received correctly and that the deal can be considered complete at that point. In addition, a broadcast message is generated that a trade has occurred which trade update message, given reference numeral 67, may possibly cause a new best bid to occur or could affect the quantity or price at the top of the book. Again, if the trades and best bids go into the ticker 60, then this information is provided to the ticker as well. Similarly, if clearing information is provided to a clearing house, this too occurs as represented by reference numeral 69. In addition, as shown and preferred, trade tickets may also be generated. Thus, trade ticket information is also preferably provided to the participating keystations 24a and 24b so that the trade tickets can be generated.

Figure 4:
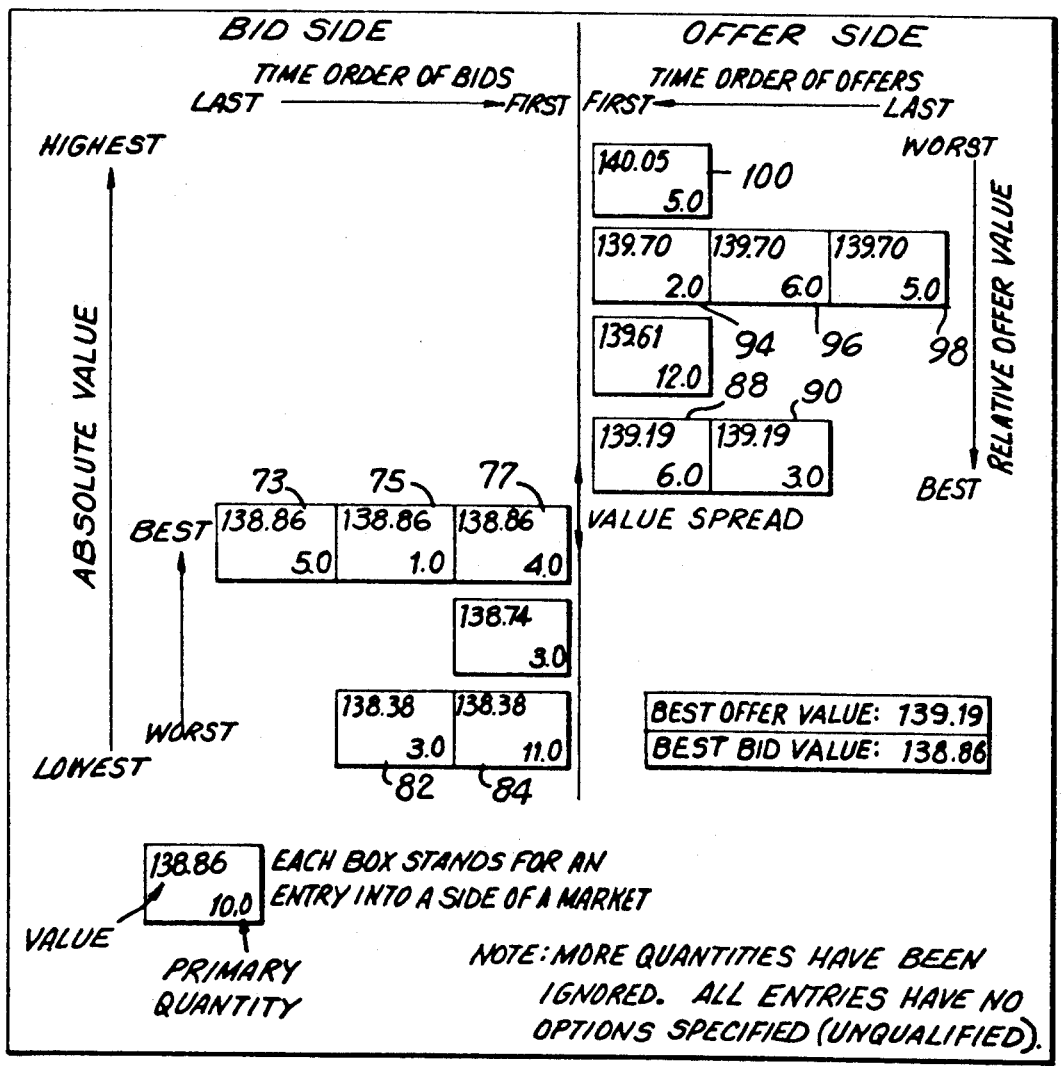
FIG. 4 is an illustrative diagram of a logical model of a book market, pre-posting, at the host or central system of the present invention and illustrates the central system book in accordance with the present invention.
Figure 5:
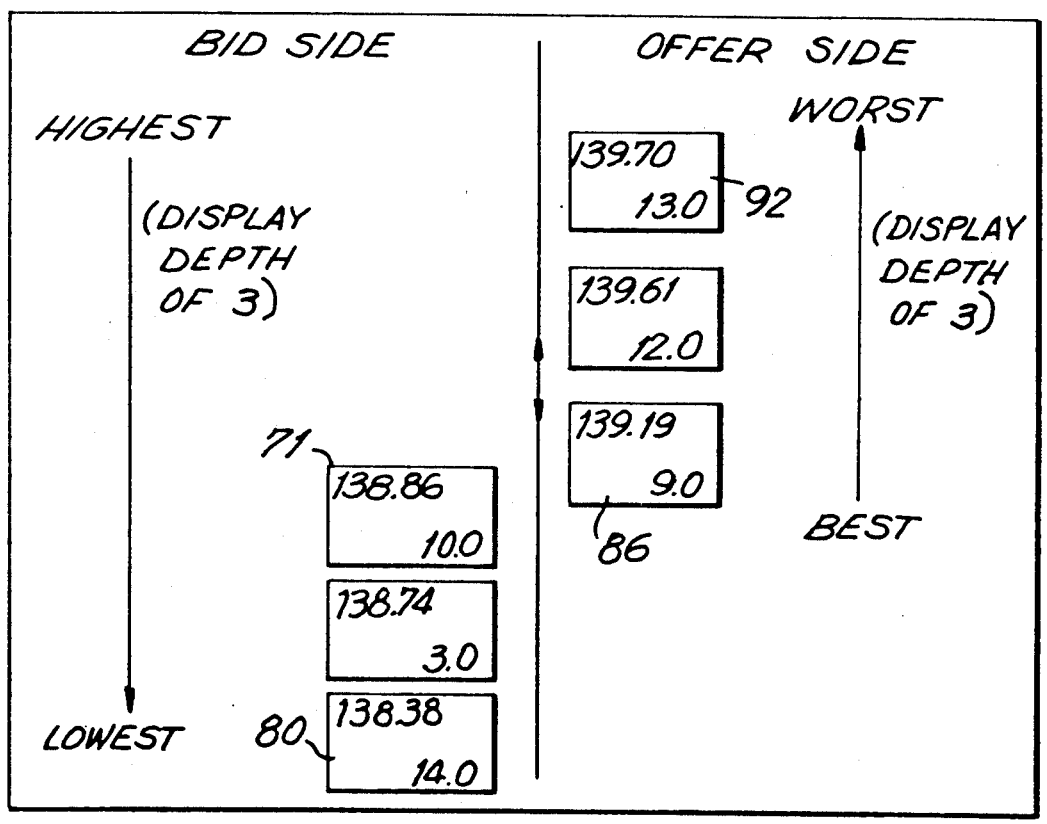
FIG. 5 is an illustrative diagram similar to FIG. 4 illustrating a typical keystation book as a subset of the central system book illustrated in FIG. 4.

Referring now to FIGS. 4 and 5, illustrations of typical books employed in the distributed matching system of the present invention are shown, with FIG. 4 illustrating a typical book at the central system 20 and FIG. 5 illustrating a typical keystation book at a typical keystation such as keystation 24a, based on the book of FIG. 4. The central station or host book illustrated in FIG. 4 is a logical model of the book market pre-posting and is divided into a bid side and an offer side. Each box in the diagram preferably stands for an entry into the side of the market. The value in the upper left hand corner of the box represents the price of the trading instrument and the value in the lower right hand corner represents the primary quantity of the trading instrument. As further shown and preferred in FIGS. 4 and 5, on the bid side the highest absolute value is at the top of the book and the lowest absolute value is at the bottom of the book, whereas on the offer side the worst relative offer value is at the top of the book and the best relative offer value is at the bottom of the book. In addition the time order of bids and offers goes from left to right with, on the bid side, the last bid being left most and the first bid being right most, whereas on the offer side, the first offer is left most and the last offer is right most. This convention is also followed in connection with the keystation book of FIG. 5 which is a subset of the system or central station or host book of FIG. 4. Thus, as can be seen in FIG. 5, the keystation books located at the client sites 26 maintain copies of the best bids and offers contained in the host book of FIG. 4 and use that information to generate displays at the keystations 24. In addition, as was previously mentioned, the display depth of the keystation book is controlled by the host computer 20. For example, in FIG. 5, a display depth of 3 is illustrated on the bid side and the offer side. It is this display depth which helps restrict the subset of the total depth of the book contained at the host computer or central system 20. In reality, there are two controls on the display depth, one is a central control by the host computer 20 which determines the maximum possible display depth for the keystation book, and the keystation 24 itself which, within that maximum parameter, can further limit the display depth of the book. Of course, the host computer also restricts the subset of the host book by limiting other information such as by withholding the identities of the parties until the transaction is completed and such other things as net together prices, and net together quantities, and maintains gross counterparty credit limits anonymously, not distributing assigned trading party credit limits to the keystations. It should be noted that in the illustrative example of FIGS. 4 and 5, bids and offers of equal goodness are drawn on the same order down the line. The central system book maintained by the host contains detailed information from each client site on the particulars of each bid or offer. Preferably each bid and offer is identified with a token to give it a unique handle by which it can be referred to in future transactions and is time-stamped based on entry into the system. As further shown and preferred in FIG. 5, the keystation book is a summary book which contains accumulated summaries of bids at the same price and offers at the same price. Thus, by way of example, block 71 in FIG. 4 is a summary of blocks 73, 75 and 77 in FIG. 4, which shows a total quantity of 10 at the price of 138.86, and block 80 is a summary of blocks 82 and 84 in FIG. 4 which shows a total quantity of 14 at the price 138.38. Similarly, on the offer side, block 86 is a summary of blocks 88 and 90 in FIG. 4, showing a total quantity of 9 at an offer price of 139.9, and block 92 is a summary of blocks of 94, 96 and 98, showing a total quantity of 13 at an offer price of 139.70. It should be noted that with respect to the offer side of FIG. 5, since the display depth is only three, the fourth worst offer represented by block 100 in FIG. 4 does not appear in the keystation book of FIG. 5 since it is outside the designated display depth range.

With respect to the user entry record maintained at the central database 20, preferably such items as the bidder offer indicator, the instrument ID number, the quote, the quantity, the time-stamp, the keystation transaction number, the host transaction number, the assigned trading party credit limits, etc. are maintained. If desired, different trading instruments may be quoted in different ways. For example, you may have some trading instruments quoted on the basis of absolute price and others on the basis of yield or discount, and so on. In addition, clearing information may be stored at the central system 20. As was previously mentioned, this type of information fully qualifies the entry to the host computer or central system 20 which can perform matching based on gross counterparty credit limits and the collection of bids and offers that it has at any particular point in time, whereas the client site or keystation 24 preferably maintains copies of only some of these fields so that it can create displays. Thus, the host or central system 20 reduces the amount of network overhead that is required by transmitting only summary information about the book and typically restricts the price depths that are sent down, such as the depth of three given in the example of FIG. 5. In addition, as previously mentioned above, the host will aggregate quantities at the same price level as illustrated in FIG. 5. In allocating the accumulated summary to a match, the rules generally followed are that it goes by price, time of entry to the system, and by credit.

Now we shall briefly discuss the IXM update message structure for broadcast messages. IXM as used herein is another name for the book or an instrument crossed with a market. The book maintenance protocol or operation block protocol is preferably a way for instructing the client sites 26 to add, drop or remove particular sub-books from their associated book displays. Preferably, the host 20 enforces a structure on the client site data base which is a queue of prices whose maximum display depth is that display depth that the host enforces for that particular instrument. The IXM update message is a broadcast message which preferably contains a number of fields, such as the identifying information for the trading instrument that is being effected by this updated message, with the information being tokenized in order to minimize the bandwidth used on the network. Thus, very short numbers are used to indicate things like the trading instrument or the user or the subscriber that the system is trying to affect. In this instance, the IXM update message instructs the client site 26 to update the information being maintained in a particular instrument and contains an IXM token. As shown and preferred in FIGS. 7 and 8, the IXM update message contains a number of fields for providing the requisite summary information, such as the number of highs, lows, trades, etc., which information is used to key into the rest of the message. Preferably IXM updates are cummulative and apply to the then current state of the book maintained at the client site 26. Thus, the IXM update preferably contains new information about an IXM and the state in context of the instruments book. The message is preferably of variable length and may or may not contain certain information blocks. The IXM sequence number field preferably represents a number of updates to an IXM. The keystation 24 uses this value to preferably ensure that it receives all updates to an IXM and that it does not apply an outdated update. The block list size preferably defines how many information blocks are required for the IXM. Preferably the size of the operations list may exceed the maximum size of the message. In such an instance, the IXM is segmented across multiple messages. The number of highs specifies that a high quote is being sent, which typically would be only a one or zero. Similarly the number of lows specifics that a low quote is being sent, which would typically only be a one or a zero. The number of trades preferably specifies the length of the trade list for the message which is used for the last trade statistic as well as for support of the ticker. Typically the IXM image would only have, at most, a single trade block to indicate the last trade if there was one. The number of operations preferably specifies the length of the operation list for the message. If the block list size does not equal the sum of the number of highs, number of lows, number of trades, and number of operations, the IXM has been segmented across multiple messages. At least one IXM segment message will then preferably follow. When the sum of all the number of highs, lows, trades and operations fields across the segmented messages equal the block list size, then preferably the IXM data set is complete.

In order to get the book initially at the keystation, it is requested from the central system 20 during an initialization sequence. Thus, the first thing that a keystation 24 at a client site 26 does when it connects the network 22 and, thereby, through to the central system 20, is to request a download of all the currently active books. The host 20 then preferably sends a snapshot of each book and, from then on, the central system 20 will continue to send out updates on either a periodic basis or immediately after each change to indicate that the various items in the book have changed.

It should be noted that, preferably, with a single parameter change at the host system 20, effectively the view which the entire "world" or system population obtains with respect to a particular instrument is effectively changed. In this regard, if the host system 20 sets the display depth equal to one then, preferably, that means that no one can look into the book and that the host will not send out updates off of the best price display. This display depth can, of course, be dynamically changed by the host on a daily basis or on any other periodic basis desired to provide centralized control over the distribution of the book. It should be noted that preferably all of the data in the system is logical data; that is all of the fields have meaning to the system.

In this regard, in order to understand the distributed book structure of the present invention, it should be understood that a book as used herein is the repository for bids/offer information on a particular trading instrument. Depending where that book is maintained, the sort of information that goes into it is going to be different so that the repository for bid/offer information on a given financial instrument, such as Japanese Yen, in the host 20 contains things like individual bids and offers, their identities, the clearing information and all of that maintained in strict price/time priority; whereas the book on Japanese Yen maintained at the client site 26 preferably contains some summary information about the total quantity bid and offered at a particular price, and does not contain all bids and offers, it only contains the ones that are appropriate.

There are actually two collections of information which are being maintained at the client site 26. One of these collections of information is the book for each instrument which is maintained at the keystation 24 sites which have been given reference numerals 110, 112, by way of example in FIG. 6. Another book maintained at each site is the local entry data base or order book which has been given reference numerals 114 and 116 in FIG. 6. As previously mentioned, there is also the host or system book database, given reference numeral 118 in FIG. 6. Each time a client site 26 starts up as a keystation 24, as was previously mentioned, the keystation 24 is preferably initially empty and requests the download of the currently active books from the central system 20. As was previously mentioned, separate books are maintained for each trading instrument, so there would be a separate book for Japanese Yen, a separate book for Deutsch Mark, a separate book for dollars, etc., assuming that the system of the present invention was used for trading foreign exchange currencies. Each of these books would be maintained at a given display depth. In this regard, it should be noted that an IXM update broadcast message is only broadcast when the price information is inside the assigned display depth that has been assigned by the host computer or central system 20. With respect to the local entry database or order books 114, 116, these order books 114, 116 are updated by directed messages from the central system 20 and/or record the orders of the particular keystation 24b or 24a which have been sent to the central system 20. In this regard, these order books 114, 116 are preferably kept current so that it is a listing only of orders which are still present in the central system 20 from the respective keystations 24b or 24a. This order database 114 and 116 gets modified, such as through the removal of data, due to various occurrences, such as when a complete match has occurred for a given order an entry remove message is provided, or if it is partial match you may get an entry message that tells you that only that a partial match has been done against that order. The match notification which was previously referred to preferably refers to a particular order that is contained in the order database 114 or 116 and indicates what quantity or portion of the order has been matched. If all of the order has been matched, the entire order is then preferably deleted from the respective order database 114 or 116. By way of example, if a bid were put in for ten million Yen at a price of 127 and the display was enabled, that is the display depth was set to something greater than or equal to one, then the central system 20 would preferably construct a broadcast message, which is the aforementioned IXM update broadcast message, which would inform all client sites 26 that a new bid had been added to the Yen book, assuming that were the instrument being traded. The IXM update message would instruct an operation block which would say add to index one the ten million at 127. As for the other parameters in the IXM update message, add index would equal one, type would equal bid, quote would equal 127 and quantity would equal ten million. In the above example, the transaction achieves two functions. The first function it achieves is that a bid is submitted and the host system 20 responds to the keystation 24a submitting the bid that the bid was accepted and that there was no ambiguity in that the bid is definitely in the system 20, the system 20 has it, and the local entry database 116 has it. The other function indicates that the bid was of a certain characteristic that the rest of the "trading world" in the system should know about and this is accomplished as a result of the IXM broadcast message which was generated to all of the client sites 26 which were then told about this in summary as opposed to being given all of the detailed information. It should be noted that, as previously mentioned, in terms of functional operation, the entry of a bid to the system is the same as entry of an offer.

In the situation when a trade occurs, this means that a matching offer is present in the system, the host system 20 has accepted that matching offer, and sends back the acknowledgment command, in effect retrieving the existing book on Yen, in the above example, finds out that there is ten million Yen at 127 in the book, adds to that the newly entered fifteen million and 127, and is aware that it has positioned fifteen million at 127. The host 20 then does the match up including that ten million and does the trade, taking out the existing bid, so it reduces that amount to zero million at 127 leaving over five million at 127 on the offer side. In this instance, as will be explained with reference to FIG. 6, at least two directed messages have been sent, actually four having been transmitted to the client sites 26 that are involved in the trade. The seller will get an indication that his Yen bid has traded by means of a match notification and he will, thereafter, be informed who the counterparty was after the match has been made. The clearing and settlement of the trade will then preferably be the responsibility of the subscribers. The counterparty who originally transmitted the offer and entry position message saying that it had a Yen offer positioned greater than the bid will then get an entry positioned Yen offer at five million at 127 and will get a match notification saying that, with respect to his offer, ten million of his original fifteen million has traded with the party who will then be identified Lastly, the IXM update broadcast message will be constructed and broadcast to all client sites 26 to update the trading book. That update message will preferably, in the above example, contain two operation blocks, one which will remove the bid information from the client book and the second which will post the new five million offer which remains on the offer side and will show that a trade took place. In addition, as was previously mentioned, if desired, ticker information will also be provided in the IXM update message saying what traded, keeping track of the cummulative volume, the net change, the number of changes, the high limits, the low limits and so forth. It should be noted that preferably only the keystation 24 that either executed the transaction or was involved somehow in that transaction will receive the directed message with respect thereto and not other keystations 24 at the same client site 26, whereas with respect to broadcast messages all keystations 24 at all client sites 26 receive these messages. If desired, with respect to credit, which does not form part of the present invention herein, this can be controlled on a client site 26 by client site 26 basis as opposed to a keystation 24 basis. Thus, in the system of the present invention, the network 22 has two functions, one of which is directed message delivery and the other of which is broadcast message delivery.

Figure 15:
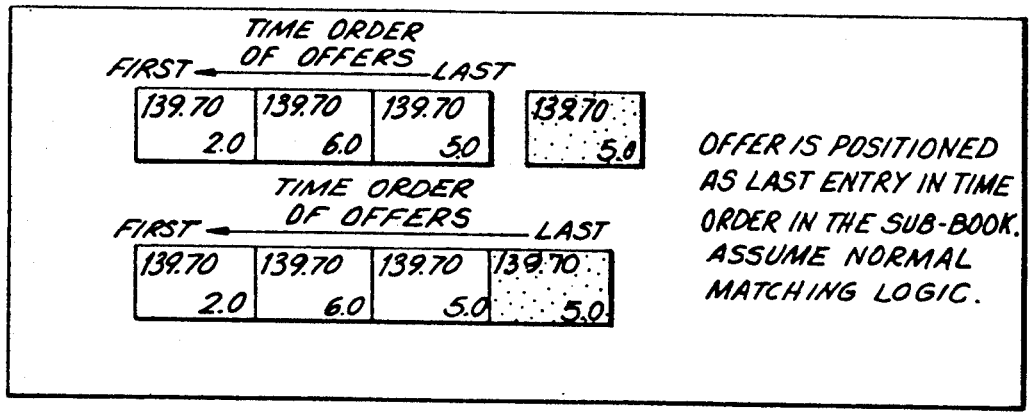
FIG. 15 is an illustration similar to FIG. 4 of an auction market entry position, market equal, based on the book of FIG. 4.
Figure 16:
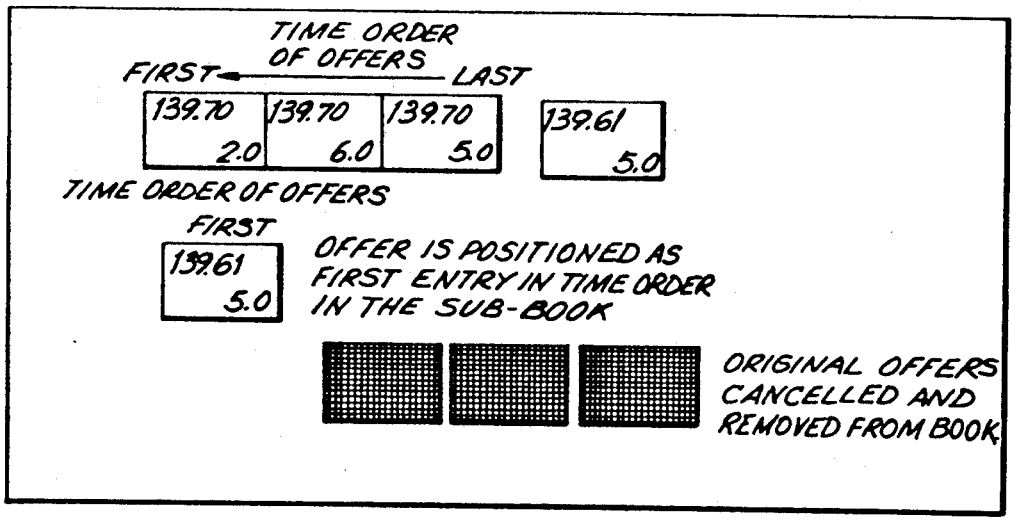
FIG. 16 is an illustrative diagram similar to FIG. 15 of the auction market entry position, with the market bettered, based on the book of FIG. 4.

Referring now to FIG. 6 in greater detail, the network 22 which, as was previously mentioned, is transparent to transactional information has been omitted for purposes of explanation of the message flow in the system of the present invention. For purposes of the example of FIG. 6, keystation 24a can represent any keystation which originates a transaction and keystation 24b can represent any keystations which are involved as counterparties in the transaction, which, as was previously mentioned can be more than one keystation at more than one location. The keystations 24a and 24b are normally remotely located from each other such as, for example, keystation 24a being in New York and keystation 24b being in London. In addition, the keystations 24a and 24b are remotely located from the central system 20. In order to understand the message flow illustrated in FIG. 6, we will assume that the originating keystation 24a is receiving a display of the keystation book database located at keystation 24a. Assuming that the operator at that keystation 24a then desires to enter a bid or an offer, either of which will be termed an order, this information is input to the keystation 24a via conventional means, such as a keyboard or a mouse by way of example. The keystation 24a then preferably validates the order and maintains its local order data base or local entry data base 116. The order, instead of being a bid or an offer, could be a hit or a take for a particular trading instrument as well since all of these various items would constitute an entry of an order. After the order has been entered, validated, and, the order data base 116 maintained, a transaction message is built and sent as a directed message to the central system 20. This is represented by reference numeral 120 in FIG. 6. This transaction message 120 is received by the central system 20 and contains transaction information. At this point, preferably the central system 20 sends back a directed message, termed a command acknowledgment message and given reference numeral 122, to inform keystation 24a that the transaction message 120 has been received. The transaction message 120 is time-stamped by the central system 20 at this point. Preferably the display of keystation 24a will indicate "please wait" until the transaction message 120 has been acknowledged. Preferably, such acknowledgment happens relatively quickly, such as in about two seconds, by way of example. The central system 20 then preferably processes the transaction message 120 against the central system 20 stored copy of the system or host book which is contained in the host book data base 118 subject to gross counterparty credit limits. At this point, the central system 20 preferably either adds the entry of the transaction or the order from keystation 24a to the host book data base 118 or matches that entry against existing bids and offers contained in the host book data base 118. Once that processing is completed, assuming the gross counterparty credit limit hsa not been exceeded, the central system 20 is ready to generate output messages not only to the originating keystation 24a, but possibly to other keystations 24 such as the counterparty keystations represented by 24b and, assuming the gross counterparty credit limit between keystations 24a and 24b has not been exceeded and that an update message is required, to all keystations in the system. Thus, central system 20 generates directed messages back to each of the keystations 24 involved in the matching transaction, such as 24a as the originating keystation and, assuming that there is a match, 24b as the counterparty keystation, and generates the IXM update broadcast message to all keystations 24. It should be noted that, as previously mentioned, a single transaction message 120 from keystation 24a, whether it is a hit, or a take, or a bid, by way of example, could result in multiple matches. For example, if keystation 24a wants to hit the bid for a quantity of 20, it is possible that to satisfy that order more than one match could be involved such, as for example, four or five different matches, particularly, since the keystation book at keystation 24a merely displays accumulated summaries of the bids or offers, such as represented by blocks 71, 80, 86 and 92 in FIG. 5. If multiple matches occur, then, thereafter, the identity of all of the counterparties involved in the multiple matches are displayed on the screen of the originating keystation 24a for a settlement purposes. Thus, on any given transaction, there will always be directed messages involving the transaction originator and involving one or more counterparties or affected parties in that trade or transaction. If the market is an auction market, then it preferably has a price depth of one so that this determines how many prices the central system 20 can maintain with only one price being maintained in an auction market. When a new bid goes in which betters the existing bid in an auction market, the existing bid is actually removed and effectively cancelled in the book. By way of example, an auction market is represented by FIGS. 15 and 16. Preferably, after all of the directed messages are generated to the counterparties, and the associated directed message acknowledgments, such as represented by reference numerals 124, 126, 128 and 130 in FIG. 6, the IXM update broadcast message, represented by reference numeral 132 in FIG. 6, is sent to all keystations 24 in the system regardless of whether or not they were involved in this particular matching transaction. It should be noted that preferably the first six steps illustrated in FIG. 6 with respect to the central system 20 are all essentially a-synchronous to any outside events. When the keystations 24a and 24b received the update broadcast message it will be processed against the local keystation book database 110, 112 and the local copy of the book will be maintained. As was previously mentioned, it should be noted that this local keystation book 110, 112 is not an exact carbon copy of the central system book 118 but rather is only a selected subset of it which comprises an accumulated summary of bids and offers within the assigned display depth. Thus, preferably, FIG. 6 illustrates a generic template for the processing of messages throughout the system of the present invention in order to provide the distributed functionality of the system.

It should be noted that the concept of originating keystation and counterparty keystation moves around with each transaction so that for each transaction the originator may be different and may for different transactions occurring at the same time be an originating keystation in one instance and a counterparty keystation in another instance. In addition, there are other instances in which the keystation may merely be a bystander and not involved in the particular transaction at all. Preferably the control of the overall distributed matching system is maintained by the central system 20 which operates in accordance with a set of rules, to be described in greater detail hereinafter, which govern how the transactions are processed. Preferably, the central system processes transactions against a particular trading instrument in time order of entry into the system. In this regard it should be noted that it is not time entry of orders per se but time entry of orders related to a particular trading book or trading instrument. Thus, there would be time order entry assigned to Yen, a different time order entry consideration assigned to Deutsch Marks, and so forth if the trading instruments were foreign exchange currencies.

Figure 13:
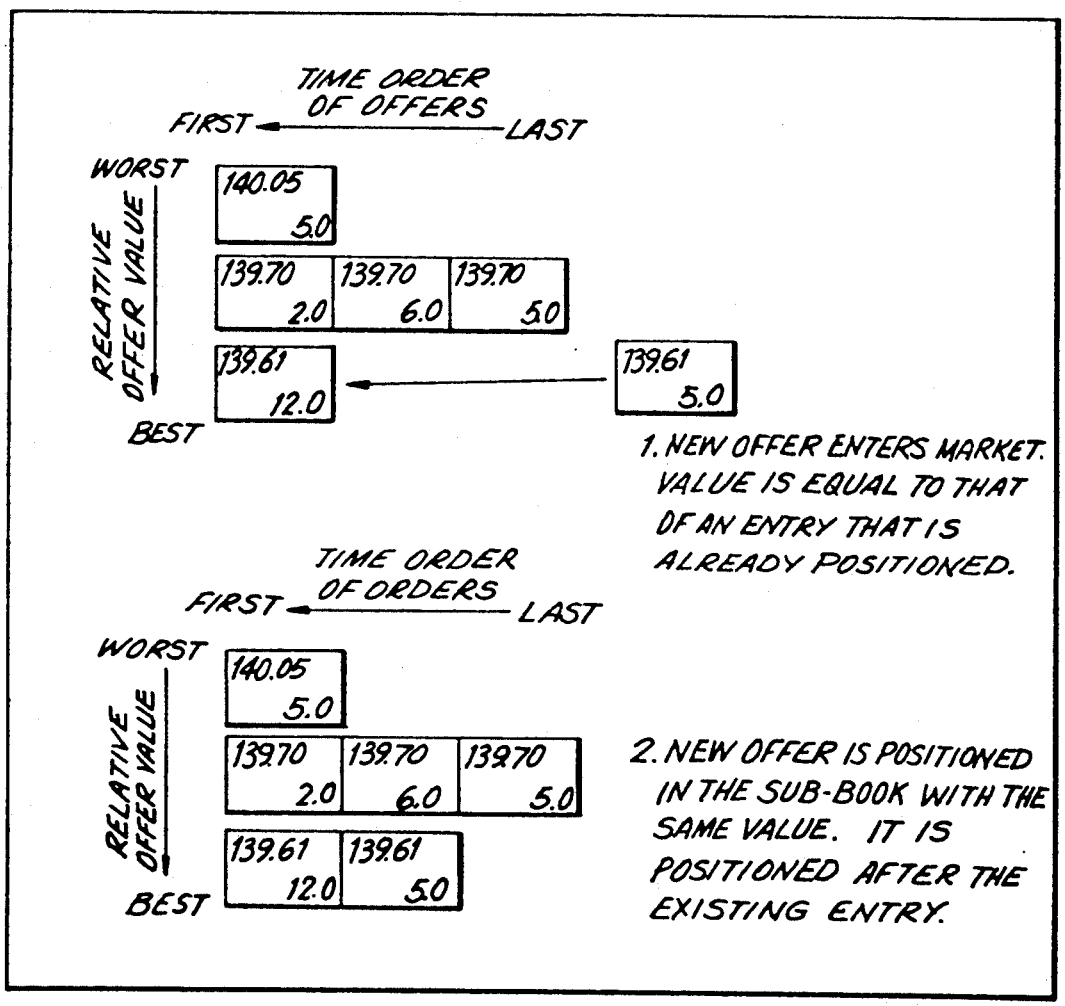
FIG. 13 is an illustrative diagram similar to FIG. 4, illustrating a book market entry position, at market, based on the example of FIG. 4.
Figure 14:
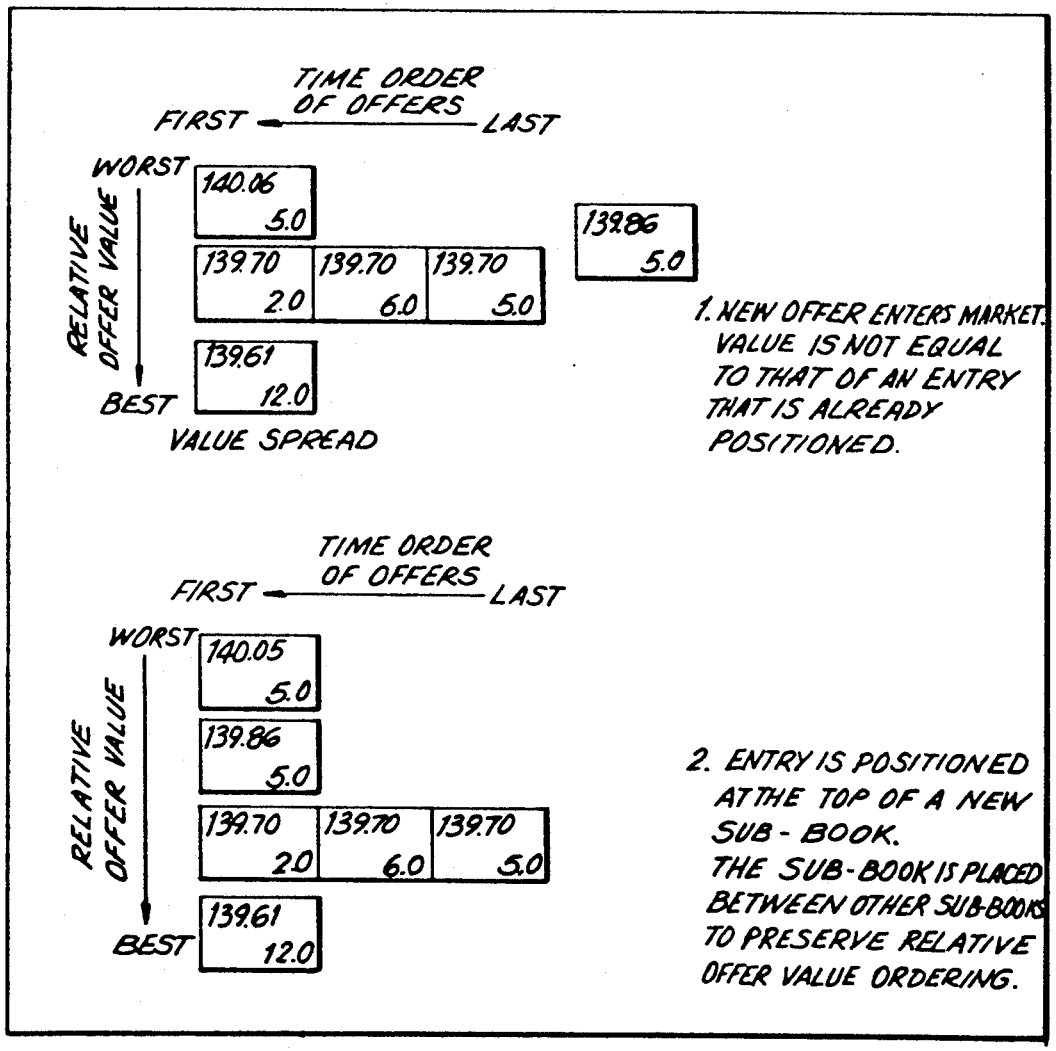
FIG. 14 is an illustrative diagram similar to FIG. 4 of book market entry position, with the creation of a new sub-book based on the book illustration of FIG. 4.
Figure 17:
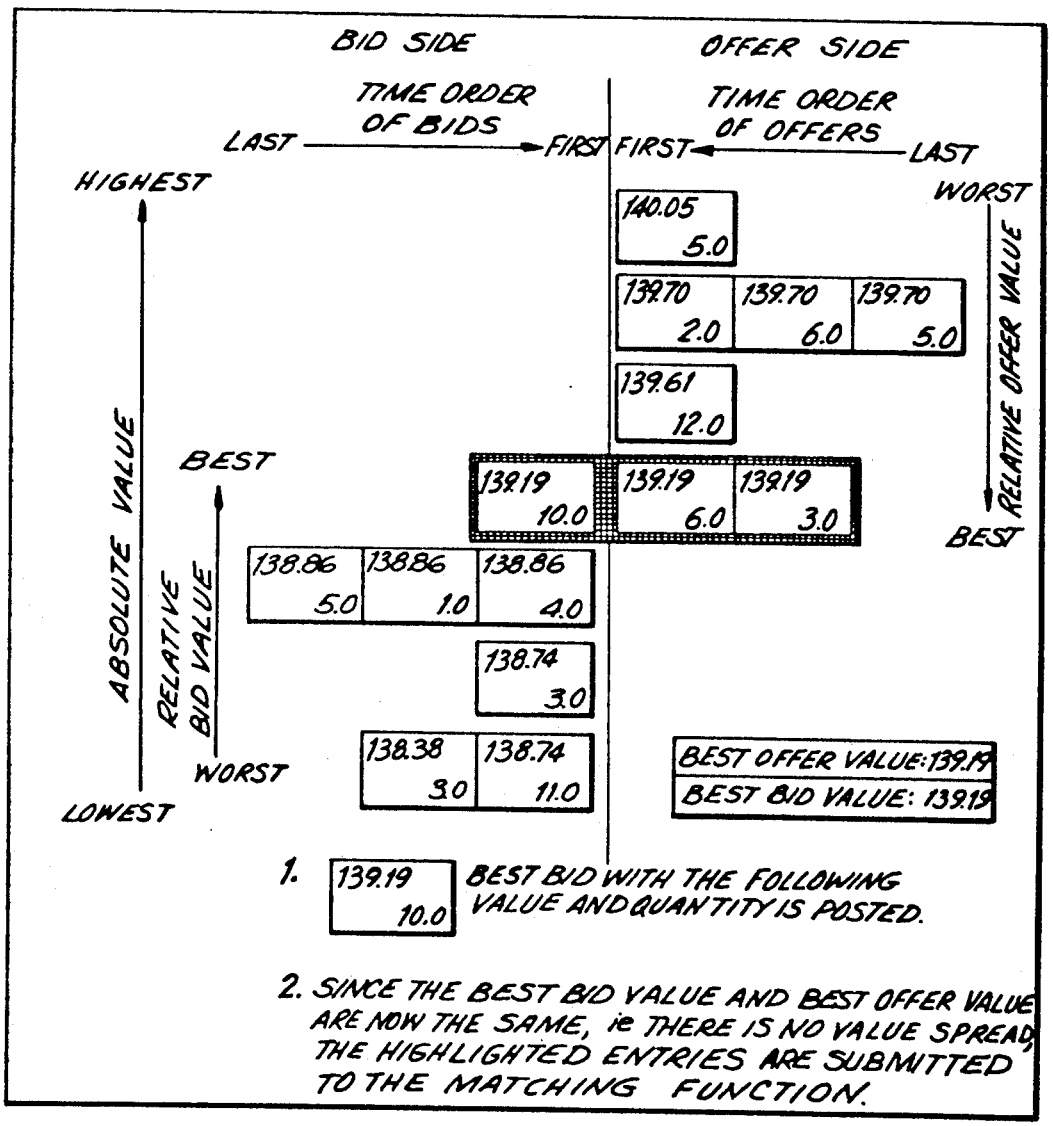
FIG. 17 is an illustration of a logical model of the book market, similar to FIG. 4, after posting.
Figure 18:
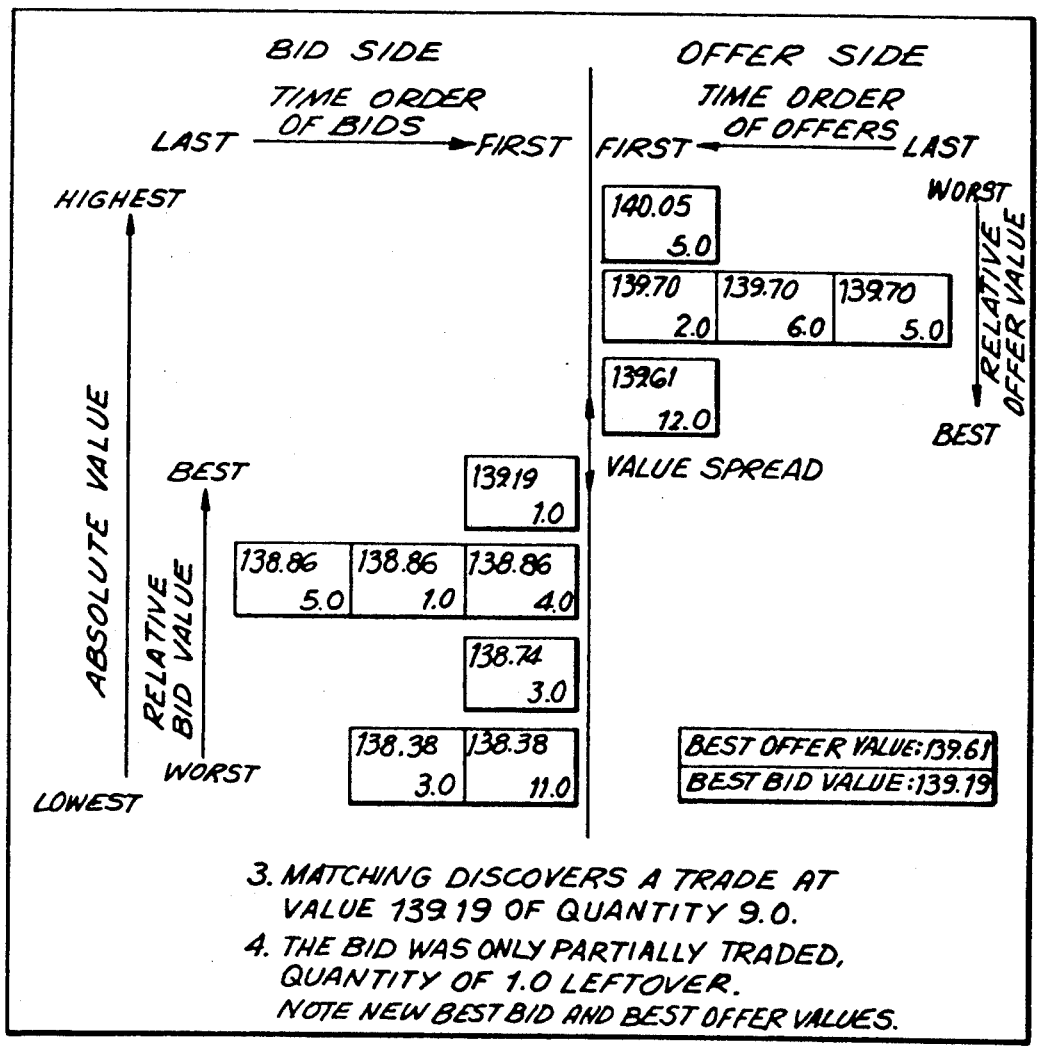
FIG. 18 is an illustrative diagram similar to FIG. 4 of the logical model of the book market of FIG. 4 after trade.

By way of example, FIGS. 13, 14, 17 and 18 are further illustrations of the book market, with FIG. 13 illustrating the book market entry position, at market, at the central data base; FIG. 14 illustrating the book market entry position for creation of a new sub-book; FIG. 17 illustrating a logical model of a book market after posting of a trade; and FIG. 18 illustrating a logical model of the book market after the trade. Preferably each side of the book market is made up of zero or more sub-books. In the example of FIG. 4, there are seven sub-books, four on the offer side and three on the bid side. Preferably there are two ways in which an entry can be positioned in a book market, both determined by the entry's value. If there exists a sub-book that has the same value as the new entry, the new entry is entered at the bottom of the sub-book, such as illustrated in FIG. 13. When the new entry equals the current best entry for the side of the market, the entry behaves in this fashion. If a sub-book with the same value as the new entry does not exist, then a new sub-book is created with the new entry placed at the top of the book, such as illustrated in FIG. 14. This sub-book is preferably positioned between other sub-books so that the value ordering of the sub-books is preserved. Preferably by definition a best entry does not have a value equal to that of any existing sub-book for that side of the market. A new sub-book is implicitly created when the new entry betters the current best price for that side of the market.

The behavior of an auction market, such as illustrated in FIGS. 15 and 16, is preferably dictated by the fact that there are at most one sub-book per side of a market. When an entry is worse than the current best entry, it is preferably rejected from the market. When an entry equals the current best entry, it is preferably accepted into the market and is positioned as the last entry in time order in the appropriate sub-book, such as shown in FIG. 15 by way of example. When an entry betters the existing value for the side of a market, the current entries in that side of the book are preferably cancelled, such as shown in FIG. 16 by way of example.

Referring once again to FIG. 17 and 18, matching is only attempted, preferably, when the posting function indicates that the best bid value is better than or equal to the best offer value. The matching function is preferably the same for both book markets and auction markets. In a book market, it is possible for any order to cross the market; that is, for a new bid to be higher than the best offer or a new offer to be lower than the best bid. In this case, trades are preferably allowable at multiple quotes filling the order starting at the best quote and working down to the quote specified in the new order as necessary to trade as much quantity as possible. Since the quote depth for an auction market is only 1, just the bid side and the offer side of a market are submitted to matching. If one or more matches are found, the following information is preferably given for each matching pair; namely, the buyer, the seller, the instrument, the quantity traded and the quote. As is shown by way of example in FIG. 17, there is a bid which has been introduced at the value of 139.19, a value that betters the current best bid. Since there exists no sub-book on this price on the bid side of the book, a new one is created. At this point, the best bid value is equal to the best offer value so the bid and offer sub-books with the value of 139.19 are submitted to the matching function. Assuming that the gross counterparty credit limit is not exceeded, then both of the offer entries are fully traded for a trade total quantity of nine. The bid is only partially traded and a quantity of one remains. It should be noted that with respect to FIG. 4, there are seven sub-books in the market, three on the bid side and four on the offer side with a value spread between the bid side and the offer side of the market currently existing so that no matching could take place at that time. FIG. 18 illustrates the logical model of the book market after the trade is over. In this instance the offer sub-book with a value of 139.19 in the above example has no more entries in it so the sub-book is removed. There is a bid remaining at that quantity so it remains in the sub-book. A new value spread now exists in the book.

Thus, with the system of the present invention, the books may be distributed among the keystations through the use of summary books so that information is distributed between the central system 20 and the keystations 24 in such a way that all of the right information, and only the right information, is made available at the geographically dispersed keystations. The keystations 24 need information to generate their displays which displays, in the system of the present invention, can be as up to date as possible so that the traders are provided with accurate information regarding the instruments available for trade while the keystations 24 are prevented from receiving disclosure information that they are not entitled to or that should be withheld from them because it is an anonymous trading system. Thus, not only does the distributed matching system of the present invention provide for efficient transmission of information but it enables the host to controllably mask the available trading market.

Now referring to FIGS. 19 and 20, the credit control function and the more quantity function of the system of the present invention shall now be described in greater detail. As was previously mentioned, there are two types of quantity in the system of the present invention; namely primary quantity and more quantity. Primary quantity is the amount which is disclosed in connection with the books distributed to the keystations 24 from the host 20 whereas more quantity is kept anonymous by the system of the present invention. Thus, the more quantity is not disclosed to the market at the time that the bid or offer is made but rather is hidden. In addition, as previously mentioned, credit limits are also anonymous in the system of the present invention. These trading party credit limits which are assigned by the individual keystations 24 or client sites 26 to those other keystations 24 or client sites 26 in the system in which they wish to trade, or not trade as the case may be, are preferably held anonymously in the central system 20 which determines the gross counterparty credit limits. Thus, the only individuals who know what the trading credit limits are are the owners of those credit limits; that is, the keystations 24 assigning the particular trading party credit limit. In this regard, if a trading party credit limit is set to zero then you will not trade with that party. Preferably, in determining the rules of matching to be applied by the system in the present invention, a bid can only match with an offer and an offer can only match with a bid. Thus, an order eligibility is preferably determined which says that eventually bids with offers, where there is a non-zero credit line between the counterparties for the same trading instrument, are eligible for a match where the buy price is greater than or equal to the sell price. Next, there should preferably be a quantity match, with the match quantity preferably being equal to the minimum of credit, remaining quantity of the new order, or remaining of the standing order. Thus, the match quantity is the minimum of these three things. In this regard, preferably the match may occur to the entirety of an order as opposed to distributing the order or match amongst several possible orders. In addition, preferably the priority of matching is based on time precedence; in other words, first in first out. Preferably the system of the present invention tries to maximize the total trade size each time a match occurs. In determining standing order priority, preferably it is based first on price, second on quantity type, and third on time stamp or time of entry into the system. Preferably in considering quantity type, the bid with more quantity is considered to be two bids, one of which is an offer of primary quantity at a certain price and then an offer for more quantity at a different price. Preferably the primary quantity has a higher priority than the more quantity type. By way of example in trying to understand the more quantity concept, assume that there is a new order which is bid at a dollar for quantity of 30. The system will first determine that this order should be matched against standing orders that are eligible. Assuming all the orders are eligible orders, then the system is going to say that against each one it will trade up to its maximum and will keep trading until its all done. In this regard, if in the course of matching you run up against a credit limit which causes the gross counterparty credit to be exceeded, then the matching trade occurs up to the gross counterparty limit so that the match size is the minimum of the credit, the standing order size or the primary size. As was previously mentioned, the system of the present invention basically operates with credit limits on the concept of gross counterparty limit. In this regard it is not enough for a keystation 24 to extend a trading party limit to a counterparty, it is also preferably necessary that the counterparty extend a trading party credit limit to that keystation, in which instance the minimum of the two trading party credit limits would represent the credit line or gross counterparty limit between the two keystations. By way of example, if the keystation 24a buys 10 million dollars worth of Deutch marks from another keystation 24b and sells 10 million dollars worth of Deutch marks to that same keystation 24b, that transaction would have consumed 20 million dollars of the gross counterparty credit limit between these two keystations 24a, 26b. Of course, if desired according to the system of the present invention, any trading party credit limit can be changed or all credit limits may be reset. Preferably the minimum of the credit that a keystation 24 has remaining with another keystation 24 and the credit that that keystation 24 has with the originating keystation 24 will determine the maximum possible match size.

In addition to the above, there is a credit alert threshold. Preferably the permission to modify credit limits in the system of the present invention is only given to somebody having that special privilege. Preferably, if in the course of trading your credit remaining goes to a value less than 25% of the original value of the credit limit, an alert is sent out to anybody with permission to modify the limit. Thus, the credit limit alert informs a particular keystation 24 that it is trading dangerously low to the assigned credit limits it has given and that those limits are going to start blocking or inhibiting trades if nothing is done about changing them. As was previously mentioned, although credit limits are assigned to individual keystations 24 they are held in the central system 20 so that when a potential matching trade is to occur, it's not the keystation 24 function to determine the size of that trade but rather it is the central system 20 function. Because of credit limits, it is possible that a bid or offer could be put into the system which is not capable of being matched with any other bid or offer because all of the trading party credit limits assigned by the originating keystation 24 are zero or because no other keystation 24 in the system has extended a trading party credit limit to the new keystation 24 entering the system.

Furthermore as previously mentioned, the matching algorithm employed in the central system 20 of the present invention preferably uses credit controls to determine the quantity of permissable match to the lowest common limit and the best bid/ask price for the largest available quantity to automatically complete a matching transaction or trade. Thus, a matching system is provided in which real time prices are the subject of real time credit. Moreover it should be noted that preferably prices of the best available bid are used to dynamically update prices.

Summarizing the presently prefered matching rules for the system of the present invention, a new order is eligible to be matched with a standing order and a trade or matching transaction will result whenever one order is a buy order, the other is a sell order, the buy order and sell order originate from different entities, a non-zero and credit line exists between the two entities, the two orders are against the same instrument, and the price of the buy order is greater than that of the price of the sell order. Secondly, if an order match is possible according to the above criteria of order eligibility, then the trading transaction would take place at the price of the standing order preferably. Moreover if an order match is possible according to the criteria of order eligibility, then the trade will preferably take place for a quantity equal to the minimum of the available credit line, the remaining quantiy of the new order, and the remaining quantity of the standing order. Whereas the order eligibility rule defines the criteria for matching, the quantity rule is used to define the size of an eligible trade. Preferably, if there are multiple standing order eligible for matching against a new order is then matches will be considered in priority sequence until one of the following conditions are obtained; namely the new order completely filled or all eligible standing orders have been considered. Thus, simply stated, each new order is traded to its maximum potential. Preferably the priority of the standing order relative to other standing orders for the same instrument is based on price, quantity type, and time stamp. With respect to price, for buy orders, preferably the higher price is the higher priority and for sell orders the lower price is the higher priority. With respect to quantity type, preferably a standing order for primary quantity has a higher priority than a standing order for more quantity if they are both at the same price. With respect to time stamp, preferably within the same price and same quantity type, older orders have a higher priority than more recent orders. Thus, the sort sequence for standing order priorities preferably by price, the quantity type, by time stamp. In this regard, however, if more quantity is at a better fill price, then it has a higher priority than primary quantity.

Whenever a party initiates a credit change transaction which increases the credit extended to one or more counterparties the following sequence of events occurs: credit changes performed; all the subscriber's bids and offers in crossed markets, which is a market in which to bid price is equal to or greater than the offer price, are evaluated for trade potential with standing orders on the opposite side of the book; if any single instrument contains multiple bids or offers from the entity who has performed the credit change, then these bids and offers are evaluated in time sequence; and if the party who has performed the credit change has bids and offers in multiple instruments with crossed markets, then the individual instruments are evaluated in an arbitary sequence.

Preferably, the system of the present invention supports four different order types which are used to buy or sell instruments in the matching system of the present invention. These order types are referred to as bid, offer, hit (also known as yours), and take (also known as mine). These orders are preferably differeniated from one another according to a set of time, price and size constraints which are either explicitly or implicity provided at the time of order entry. Preferably all system orders, regardless of type, are price limit orders. This means that the order, whether it be bid, offer, hit, or take, is preferably restricted to execute at the specified price or better. For a bid or take, the term "or better" preferably means at the specified price or lower, whereas for an offer or hit, this term preferably means at the specified price or higher. Furthermore, every system order must preferably carry one of two possible time constraints which are actually implied by the order type. Hit and take orders have the implied constraint fill-or-kill (FOK). These orders must be fully or partially filled at the time they are presented and then they are removed from the system or killed. Bid and offer orders preferably have the applied constraint good 'till cancel (GTC). These orders preferably must remain in the system until explicity cancelled or until the end of the user's session. In addition to these order limitations, all orders must preferably specify primary quantity. In the case of bid and offer orders, more quantity may also be preferably included with the order but only if a primary quantity is also included. FIG. 19 is aN illustration of the order types implemented in the system of the present invention with fill-or-kill represented by the expression FOK and good-till-cancel represented by the expression GTC. It should be noted that preferably hit or take specifies a price which crosses the market, that is a hit with a price lower than the best bid, and is effectively a market order in the sense of the commodities markets and will execute at the best available price, and will go as far into the order book as needed until the order is filled or the limit price is reached.

With respect to the credit control mechanism of the present invention, it comprises gross counterparty credit limit controls, as was previously mentioned. Thus each party is allowed to extend a credit limit or trading party credit limit to any other counterparty in the system. It is the act of extending a trading party credit limit which allows trades to take place between two keystations 24. Assuming two keystations 24 have each extended credit to one another, they will be allowed to trade until the remaining credit reaches zero. Every trade will draw down the available credit line for both sides of the trade and preferably, no trade may take place unless sufficient credit is available on both sides.

Basically four credit control functions are implemented in the system in the present invention. These functions are modified credit limits, reset credit limits, view credit limits, and credit limit alert. When the modified credit limits function is involved, the user is preferably presented with a list of all subscribers on the system. The user desirous of modifying credit limits may then assign a numerical credit limit to any subscriber in that list. When complete, a new list of trading party credit limits is sent to the host or central system 20 thereby defining a new current and future default credit limit for the originating subscriber. In addition, at any time, a user may invoke the reset credit limits function thereby resetting all counterparty credit limits to their original default values. This function would normally be performed prior to the start of trading each day. Credit limits are preferably reset for each counterparty to the last value specified in a modified credit limit function for that counterparty. In order for a trader to see how much of the original credit line remains to other subscribers, a view credit limits function may be selected. When this function is executed, the central system 20 preferably supplies a list of all counterparties to whom a credit line has been extended, together with the dollar amount of the original credit limit which remains. The information is preferably provided as a snapshot; namely, it will not dynamically update as trades take place. As was previously mentioned, the credit limit alert function identifies an impending total draw down of counterparty credit lines. Preferably, the credit limit alert is sent once for each trade performed after the 75% threshold is reached. The credit limit alert is only preferably triggered when a trade occurs within the threshold region. If the credit becomes totally exhausted, then preferably no further trading will occur and no further alerts will be generated. Preferably, any user or keystation 24 may retrieve his and only his site's credit list for viewing only, with the information being presented, by way of example, in the form illustrated in FIG. 20. In FIG. 20, the credit limit field is the maximum gross dollar amount of trading permitted between the requestor organization and the identified counterparty organization, and the credit remaining field is the original credit limit plus all trades executed since credit was reset with this counterparty. The display is preferably non-updating; that is the credit remaining column will not change once on display even if trades take place within the named organization.

Thus, by using credit control in accordance with the present invention, subscribers may limit the amount of credit exposure they have with other subscribers in the system of the present invention, with credit control being managed as a gross counterparty limit extended on a subscriber-to-subscriber basis across all trading instruments. In accordance with the system of the present invention, completion of potential matching transactions between transaction originating keystations and counterparty keystations are inhibited or blocked when the potential matching transaction has an associated value in excess of the gross counterparty credit limit. Thus, the credit control mechanism of the present invention controls who subscribers trade with in an anonymous trading system which is important since the identities of the parties involved in a trade are not revealed until after the trade has taken place at a time which would be too late to unwind the trade.

What is claimed is:

1. A matching system for trading instruments in which bids are automatically matched against offers for given trading instruments for automatically providing matching transactions in order to complete trades for said given trading instruments, said system comprising a host computer means comprising means for anonymously matching active bids and offers in the system by trading instrument based on a variable matching criteria, said matching criteria comprising a dynamically variable counterparty credit limit between potential counterparties to a potential matching transaction; a transaction originating keystation means for providing an offer on said given trading instrument involved in said potential matching transaction; and network means for interconnecting said host computer means, said transaction originating keystation means and said counterparty keystation means in said system for enabling data communications therebetween, both said transaction originating keystation means and said counterparty keystation means for said potential matching transaction each having an associated counterparty credit limit, said system inhibiting completion of said potential matching transaction between said transaction originating keystation means and said counterparty keystation means when said potential matching transaction has an associated value in excess of said associated counterparty credit limit, each of said keystation means comprising means for variably assigning a trading party credit limit for said potential counterparty to said potential anonymous matching transaction, said keystation trading party credit limit assigning means comprising means for dynamically varying said assigned trading party credit limit for said potential counterparty for providing dynamically variable real time credit control between said potential counterparties to said potential matching transaction, said associated counterparty credit limit being based upon said assigned trading party credit limits for each of said counterparties involved in said potential matching transaction, said dynamically variable assigned trading party credit limits being provided to said host computer means from said keystation means for providing said associated counterparty credit limit, said host computer means being dynamically responsive to said keystation provided dynamically variable assigned trading party credit limits for dynamically varying said variable matching criteria based thereon for providing said dynamically real time credit control for said anonymous matching transactions between said individual keystations.

2. A matching system in accordance with claim 1 wherein said counterparty credit limit is an anonymous credit limit to said counterparties.

3. A matching system in accordance with claim 2 wherein said counterparty credit limit is a gross counterparty credit limit.

4. A matching system in accordance with claim 1 wherein said counterparty credit limit is a gross counterparty credit limit.

5. A matching system in accordance with claim 1 wherein said matching criteria further comprises real time prices of said bids and offers, said real time prices being subject to said counterparty credit limit in real time.

6. A matching system in accordance with claim 5 wherein said counterparty credit limit is an anonymous credit limit to said counterparties.

7. A matching system in accordance with claim 6 wherein said counterparty credit limit is a gross counterparty credit limit.

8. A matching system in accordance with claim 5 wherein said counterparty credit limit is a gross counterparty credit limit.

9. A matching system in accordance with claim 5 wherein said matching criteria further comprises associated quantity value of said given trading instrument bids and offers.

10. A matching system in accordance with claim 9 wherein said counterparty credit limit is an anonymous credit limit to said counterparties.

11. A matching system in accordance with claim 10 wherein said counterparty credit limit is a gross counterparty credit limit.

12. A matching system in accordance with claim 9 wherein said counterparty credit limit is a gross counterparty credit limit.

13. A matching system in accordance with claim 1 wherein said matching criteria further comprises associated quantity value of given trading instrument bids and offers.

14. A matching system in accordance with claim 13 wherein said counterparty credit limit is an anonymous credit limit to said counterparties.

15. A matching system in accordance with claim 14 wherein said counterparty credit limit is a gross counterparty credit limit.

16. A matching system in accordance with claim 13 wherein said counterparty credit limit is a gross counterparty credit limit.

17. A matching system in accordance with claim 1 wherein said counterparty credit limit comprises the minimum of said trading party credit limits for each of said counterparties involved in said potential matching transaction.

18. A matching system in accordance with claim 1 wherein said keystation credit limit varying means comprises means for dynamically resetting all trading party credit limits assigned by said keystations means.

19. A matching system in accordance with claim 18 wherein said counterparty credit limit is an anonymous credit limit to said counterparties.

20. A matching system in accordance with claim 19 wherein said counterparty credit limit is a gross counterparty credit limit.

21. A matching system in accordance with claim 1 wherein said host computer means further comprises means for providing a credit limit alert when said assigned trading credit limit goes below a predetermined value.

22. A matching system in accordance with claim 21 wherein predetermined value comprises 25% of the original value of said assigned trading party credit limit.

23. A matching system in accordance with claim 21 wherein said keystation credit limit varying means comprises means for dynamically resetting all trading party credit limits assigned by said keystation means.

24. A matching system in accordance with claim 1 wherein said matching criteria further comprises price and quantity, said means for anonymously matching said bids and offers comprising means for determining the quantity of permissible match at the lowest common counterparty credit limit and the best bid/ask price for the largest available quantity for automatically completing said potential matching transaction.

25. A matching system in accordance with claim 24 wherein said counterparty credit limit is an anonymous credit limit to said counterparties.

26. A matching system in accordance with claim 25 wherein said counterparty credit limit is a gross counterparty credit limit.

27. A matching system in accordance with claim 24 wherein said host computer means further comprises means for dynamically updating said prices based on the best available bids in said system.

28. A matching system in accordance with claim 27 wherein said counterparty credit limit is an anonymous credit limit to said counterparties.

29. A matching system in accordance with claim 28 wherein said counterparty credit limit is a gross counterparty credit limit.

30. A matching system in accordance with claim 1 wherein said host computer means comprises means for processing said matching transactions for a given trading instrument in time order entry to said matching system.

31. A matching system in accordance with claim 30 wherein said matching criteria further comprises an order priority based on price, quantity type and said time order entry.

32. A matching system in accordance with claim 31 wherein said counterparty credit limit is an anonymous credit limit to said counterparties.

33. A matching system in accordance with claim 32 wherein said counterparty credit limit is a gross counterparty credit limit.

34. A matching system in accordance with claim 30 wherein said counterparty credit limit is an anonymous credit limit to said counterparties.

35. A matching system in accordance with claim 34 wherein said counterparty credit limit is a gross counterparty credit limit.

36. A matching system in accordance with claim 1 wherein said given trading instruments comprise foreign exchange currencies.

37. A matching system in accordance with claim 36 wherein said counterparty credit limit is an anonymous credit limit to said counterparties.

38. A matching system in accordance with claim 37 wherein said counterparty credit limit is a gross counterparty credit limit.

39. A matching system in accordance with claim 36 wherein said matching criteria further comprises real time prices of said bids and offers, said real time prices being subject to said counterparty credit limit in real time.

40. A matching system in accordance with claim 39 wherein said matching criteria further comprises associated quantity value of said given trading instrument bids and offers.

41. A matching system in accordance with claim 36 wherein said keystation credit limit varying means comprises means for dynamically resetting all trading party credit limits assigned by said keystation means.

42. A matching system in accordance with claim 36 wherein said host computer means further comprises means for providing a credit limit alert when said assigned trading credit limit goes below a predetermined value.

43. A matching system in accordance with claim 42 wherein said predetermined value comprises 25% of the original value of said assigned trading party credit limit.

44. A matching system in accordance with claim 36 wherein said matching criteria further comprises price and quantity, said means for anonymously matching said bids and offers comprising means for determining the quantity of permissible match at the lowest common counterparty credit limit and the best bid/ask price for the largest available quantity for automatically completing said potential matching transactions.

45. A matching system in accordance with claim 44 wherein said host computer means further comprises means for dynamically updating said prices based on the best available bids in said system.

46. A matching system in accordance with claim 36 wherein said host computer means comprises means for processing said matching transactions for a given trading instrument in time order entry to said matching system.

47. A matching system in accordance with claim 46 wherein said matching criteria further comprises an order priority based on price, quantity type and said time order entry.

48. A matching system for trading instruments in which bids are automatically matched against offers for given trading instruments for automatically providing matching transactions in order to complete trades for said given trading instruments, said system comprising a host computer means comprising means for anonymously matching active bids and offers in the system by trading instrument based on a variable matching criteria, said matching criteria comprising a counterparty credit limit between counterparties to a potential matching transaction; a transaction originating keystation means for providing an offer on said given trading instrument involved in said potential matching transaction; and network means for interconnecting said host computer means, said transaction originating keystation means and said counterparty keystation means in said system for enabling data communications therebetween, both said transaction originating keystation means and said counterparty keystation means for said potential matching transaction each having an associated counterparty credit limit, said system inhibiting completion of said potential matching transaction between said transaction originating keystation means and said counterparty keystation means when said potential matching transaction has an associated value in excess of said counterparty credit limit, said host computer means comprising means for processing said matching transactions for a given trading instrument in time order entry to said matching system, said matching criteria further comprising an order priority based on price, quantity type and said time order entry, said quantity type comprising a primary quantity type and a more quantity type, said more quantity type being a hidden value of additional quantity beyond said primary quantity a keystation is willing to trade of said given trading instrument.

49. A matching system in accordance with claim 48 wherein said primary quantity type has a higher order priority than said more quantity type.

50. A matching system in accordance with claim 48 wherein said counterparty credit limit is an anonymous credit limit to said counterparties.

51. A matching system for trading instruments in which bids are automatically matched against offers for given trading instruments for automatically providing matching transactions in order to complete trades for said given trading instruments, said system comprising a host computer means comprising means for anonymously matching active bids and offers in the system by trading instrument based on a variable matching criteria, said matching criteria comprising a dynamically variable counterparty credit limit between counterparties to a potential matching transaction; a transaction originating keystation means for providing an offer on said given trading instrument involved in said potential matching transaction; and network means for interconnecting said host computer means, said transaction originating keystation means and said counterparty keystation means in said system for enabling data communications therebetween, both said transaction originating keystation means and said counterparty keystation means for said potential matching transaction each having an associated counterparty credit limit, said system inhibiting completion of said potential matching transaction between said transaction originating keystation means and said counterparty keystation means when said potential matching transaction has an associated value in excess of said counterparty credit limit, said given trading instruments comprising foreign exchange currencies, said host computer means comprising means for processing said matching transactions for a given trading instrument in time order entry to said matching system, said matching criteria further comprising an order priority based on price, quantity type and said time order entry, said quantity type comprising a primary quantity type and a more quantity type, said more quantity type being a hidden value of additional quantity beyond said primary quantity a keystation is willing to trade of said given trading instrument.

52. A matching system in accordance with claim 51 wherein said host computer means further comprises means for dynamically updating said prices based on the best available bids in said system.

53. A matching system for trading instruments in which bids are automatically matched against offers for given trading instruments for automatically providing matching transactions in order to complete trades for said given trading instruments, said system comprising a host computer means comprising means for anonymously matching active bids and offers in the system by trading instrument based on a variable matching criteria, said matching criteria comprising a dynamically variable counterparty credit limit between counterparties to a potential matching transaction; a transaction originating keystation means for providing an offer on said given trading instrument involved in said potential matching transaction; and network means for interconnecting said host computer means, said transaction originating keystation means and said counterparty keystation means in said system for enabling data communications therebetween, both said transaction originating keystation means and said counterparty keystation means for said potential matching transaction each having an associated counterparty credit limit, said system inhibiting completion of said potential matching transaction between said transaction originating keystation means and said counterparty keystation means when said potential matching transaction has an associated value in excess of said counterparty credit limit, each of said keystation means comprising means for assigning a trading party credit limit, said associated counterparty credit limit being based upon said assigned trading party credit limits for each of said counterparties involved in said potential matching transaction, said host computer means further comprising means for providing a credit limit alert to an associated keystation when said assigned trading credit limit of said associated keystation goes below a predetermined value, said keystation means further comprising means for dynamically varying said assigned trading party credit limit as a result of said credit limit alert to said associated keystation.

54. A matching system in accordance with claim 53 wherein said counterparty credit limit comprises the minimum of said trading party credit limits for each of said counterparties involved in said potential matching transaction.

55. A matching system in accordance with claim 53 wherein said keystation means for dynamically varying said assigned trading party credit limit comprises means for dynamically resetting all trading party credit limits assigned by said keystation means.

56. A matching system in accordance with claim 53 wherein said predetermined value comprises 25% of the original value of said assigned trading party trading limit.

57. A matching system for trading instruments in which bids are automatically matched against offers for given trading instruments for automatically providing matching transactions in order to complete trades for said given trading instruments, said system comprising a host computer means comprising means for anonymously matching active bids and offers in the system by trading instrument based on a variable matching criteria, said matching criteria comprising a counterparty credit limit between counterparties to a potential matching transaction; a transaction originating keystation means for providing an offer on said given trading instrument involved in said potential matching transaction; and network means for interconnecting said host computer means, said transaction originating keystation means and said counterparty keystation means in said system for enabling data communications therebetween, both said transaction originating keystation means and said counterparty keystation means for said potential matching transaction each having an associated counterparty credit limit, said system inhibiting completion of said potential matching transaction between said transaction originating keystation means and said counterparty keystation means when said potential matching transaction has an associated value in excess of said counterparty credit limit, said matching criteria further comprising an order priority based on quantity type, said quantity types comprising a primary quantity type and a more quantity type, said more quantity type being a hidden value of additional quantity beyond said primary quantity a keystation is willing to trade of said given trading instrument.

* * * * *

UNITED STATES PATENT AND TRADEMARK OFFICE
CERTIFICATE OF CORRECTION

PATENT NO. : 5,136,501

DATED : August 4, 1992

INVENTOR(S): DAVID L. SILVERMAN, et al.

It is certified that error appears in the above-identified patent and that said Letters Patent is hereby corrected as shown below:

Column 24, line 26: In Claim 22, after "wherein" insert --said--.

Signed and Sealed this

Twelfth Day of October, 1993

Attest:

BRUCE LEHMAN

Attesting Officer     Commissioner of Patents and Trademarks